US011908595B2

(12) United States Patent
Grau et al.

(10) Patent No.: US 11,908,595 B2
(45) Date of Patent: Feb. 20, 2024

(54) USE OF A SILICONE RUBBER COMPOSITION FOR THE MANUFACTURE OF AN INSULATOR FOR HIGH VOLTAGE DIRECT CURRENT APPLICATIONS

(71) Applicant: Momentive Performance Materials GmbH, Leverkusen (DE)

(72) Inventors: Beatrice Grau, Cologne (DE); Lada Bemert, Mühldorf (DE); Harry Zumaque, Cologne (DE); Oliver Safarowsky, Cologne (DE)

(73) Assignee: Momentive Performance Materials GmbH, Leverkusen (DE)

( * ) Notice: Subject to any disclaimer, the term of this patent is extended or adjusted under 35 U.S.C. 154(b) by 482 days.

(21) Appl. No.: 16/929,758

(22) Filed: Jul. 15, 2020

(65) Prior Publication Data

US 2020/0350094 A1 Nov. 5, 2020

Related U.S. Application Data

(62) Division of application No. 15/538,298, filed as application No. PCT/EP2016/050281 on Jan. 8, 2016, now Pat. No. 10,755,833.

(60) Provisional application No. 62/101,562, filed on Jan. 9, 2015.

(51) Int. Cl.

| | |
|---|---|
| ***C08L 83/04*** | (2006.01) |
| ***H01B 3/46*** | (2006.01) |
| ***C08K 3/04*** | (2006.01) |
| ***H01B 3/00*** | (2006.01) |
| ***C08K 3/36*** | (2006.01) |
| ***C08K 5/14*** | (2006.01) |
| ***C08L 83/00*** | (2006.01) |
| ***C08K 5/56*** | (2006.01) |
| ***C08J 3/24*** | (2006.01) |
| ***G01N 27/14*** | (2006.01) |
| ***H02G 15/04*** | (2006.01) |
| *H02G 15/103* | (2006.01) |
| *H02G 15/184* | (2006.01) |
| *H02G 15/064* | (2006.01) |

(52) U.S. Cl.

CPC .................. *H01B 3/46* (2013.01); *C08J 3/24* (2013.01); *C08K 3/04* (2013.01); *C08K 3/36* (2013.01); *C08K 5/14* (2013.01); *C08K 5/56* (2013.01); *C08L 83/00* (2013.01); *C08L 83/04* (2013.01); *G01N 27/14* (2013.01); *H01B 3/004* (2013.01); *H01B 3/006* (2013.01); *H02G 15/04* (2013.01); *C08J 2383/07* (2013.01); *C08K 2201/001* (2013.01); *C08K 2201/006* (2013.01); *C08L 2203/202* (2013.01); *H02G 15/064* (2013.01); *H02G 15/103* (2013.01); *H02G 15/184* (2013.01)

(58) Field of Classification Search

None

See application file for complete search history.

(56) References Cited

U.S. PATENT DOCUMENTS

| | | | |
|---|---|---|---|
| 3,159,601 | A | 12/1964 | Ashby |
| 3,159,662 | A | 12/1964 | Ashby |
| 3,419,593 | A | 12/1968 | Willing |
| 3,715,334 | A | 2/1973 | Karstedt |
| 3,775,452 | A | 11/1973 | Karstedt |
| 3,814,730 | A | 6/1974 | Karstedt |
| 4,273,697 | A | 6/1981 | Sumimura et al. |
| 4,530,879 | A | 7/1985 | Drahnak |
| 5,688,862 | A | 11/1997 | Kondou et al. |
| 5,770,216 | A | 6/1998 | Mitchnick et al. |
| 6,358,487 | B1 | 3/2002 | Omae et al. |
| 7,119,142 | B2 | 10/2006 | Higuchi et al. |
| 7,479,522 | B2 | 1/2009 | Zhu |
| 7,511,110 | B2 | 3/2009 | Fehn |
| 2003/0199603 | A1 | 10/2003 | Walker et al. |
| 2003/0213939 | A1 | 11/2003 | Narayan et al. |
| 2007/0199729 | A1 | 8/2007 | Siegel et al. |
| 2007/0213455 | A1 | 9/2007 | Amarasekera et al. |
| 2008/0293878 | A1 | 11/2008 | Funk et al. |
| 2014/0072350 | A1 | 3/2014 | Urushihara et al. |
| 2014/0202745 | A1 | 7/2014 | Kobayashi et al. |
| 2014/0246501 | A1 | 9/2014 | Proud et al. |
| 2014/0364565 | A1 | 12/2014 | Grunwald et al. |
| 2015/0001448 | A1 | 1/2015 | Wang et al. |
| 2015/0200038 | A1 | 7/2015 | Esseghir et al. |
| 2016/0122611 | A1 | 5/2016 | Yoshida et al. |
| 2017/0029623 | A1 | 2/2017 | Wang et al. |

FOREIGN PATENT DOCUMENTS

| | | | | | |
|---|---|---|---|---|---|
| CN | 103259239 | A | | 8/2013 | |
| CN | 103259240 | A | | 8/2013 | |
| JP | S48-42711 | | | 12/1973 | |
| JP | 08311340 | A | | 11/1996 | |
| JP | 10030059 | A | | 2/1998 | |
| JP | 2001031810 | A | | 2/2001 | |
| JP | H11-213771 | | | 5/2004 | |
| JP | 2014047221 | A | * | 3/2014 | ............. C08L 83/07 |
| KR | 2011-0129274 | | | 5/2010 | |
| WO | 2008/076058 | A1 | | 6/2008 | |
| WO | WO-2014189153 | A1 | * | 11/2014 | ............... C08K 3/22 |

OTHER PUBLICATIONS

Machine translation of JP-2014047221, translation generated Oct. 2022, 17 pages. (Year: 2022).*

(Continued)

*Primary Examiner* — Robert S Loewe

(74) *Attorney, Agent, or Firm* — Sand, Sebolt & Wernow Co., LPA

(57) ABSTRACT

The invention relates to a silicone rubber composition having specific dielectric properties which can be used as insulator material in high voltage direct current applications and a method for the manufacture of cable accessories like cable joints. The invention comprises as well a method for the determination of the optimum dielectric properties and the related amount of dielectric active additives.

16 Claims, No Drawings

(56) References Cited

OTHER PUBLICATIONS

Espacenet bibliographic data for CN103259240 published Aug. 21, 2013, two pages.
International Search Report for corresponding PCT/EP2016/050281 dated Jun. 9, 2016, four pages.
Espacenet bibliographic data for CN103259239 published Aug. 21, 2013, two pages.
Lewis et al. "Mechanism of Formation of Platinum(0) Complexes Containing Silicon-Vinyl Ligands," Organometallics, vol. 14, No. 5, 1995, pp. 2202-2213.
A. L. Smith (ed.) "The Analytical Chemistry of Silicons," vol. 112, 1991, pp. 356-357.
Machine Translation for JPS4842711 published Dec. 14, 1973, 4 pages.
Machine Translation for JPH11213771 published May 17, 2004, 13 pages.
Shang et al., "Electrical Conductivity and Breakdown Characteristics of SIC/LSR Nanocomposites at Different Temperatures," Advanced Materials Research vol. 981 (2014) pp. 814-817.
Pachaly et al., "Silicones," Winnacker/Küchler, Chemische Technik: Prozesse und Produkte, Band 5: Organische Zwischenverbindungen, Polymere, Copyright 2005 Wiley-VCH Verlag GmbH & Co. KGaA, 39 pages.
Abderrazak et al., "Silicon Carbide: Synthesis and Properties," Properties and Applications of Silicon Carbide, www.intechopen.com, published Apr. 4, 2011, 31 pages.
Machine translation of JP Publication No. 2013026048 published Feb. 4, 2013, 28 pages.
A data sheet for Ketjenbleck highly electro-conductive carbon black, 3 pages, 1996.
Gelest catalog, 64 pages, 2016.
Machine Translation of Choi et al. (KR-2011-0129274), translation generated on Apr. 20, 2019.
Machine Translation for JPH 08-311340, dated Nov. 26, 1996 7 pages.
Machine Translation for JPH 10-030059, dated Feb. 3, 1998 12 pages.
Espacenet Bibliographic data and Machine Translation for JP 2001-031810, dated Feb. 6, 2001 49 pages.
Korean Office Action for corresponding application No. 10-2017-7022205, dated Sep. 15, 2022 8 pages.

* cited by examiner

USE OF A SILICONE RUBBER COMPOSITION FOR THE MANUFACTURE OF AN INSULATOR FOR HIGH VOLTAGE DIRECT CURRENT APPLICATIONS

The invention relates to the use of a silicone composition for the manufacture of insulators and field grading assemblies for high voltage direct current applications, wherein a silicone composition is used which has a distinct temperature coefficient of electrical resistivity as well as method to determine the optimal amount of dielectric active filler.

The insulators comprising the inventive composition are in particular intended for use for cable accessories, as cable joint or cable termination material in high voltage direct current applications, like for high-voltage direct current power cable applications.

TECHNICAL PROBLEM

Transportation of electrical energy over the distances above 900 km is more efficient if high voltage direct current (HVDC) is used instead of alternating current (AC).

Thereby the requirements for new cables and cable accessories in HVDC are going up to 1000 kV. Insulating materials which are introduced in alternating current technology cannot be simply applied for high voltage direct current (HVDC) technology. The applicability of classical insulating materials in the increasing field of high voltage DC applications, in particular with increased voltage is limited. For cable accessories like cable joints, materials like EPDM rubber and silicones (VMQ) are widespread, since they provide a high level of volume resistivity and desirable mechanical properties for the installation in place.

Especially cable joints have to keep mechanical characteristics for installation and special dielectric characteristics to withstand high voltage direct current conditions. Materials currently used for construction of cable joints like liquid silicone rubbers are per se perfect electrical insulators with the bulk resistivity in the order of magnitude around $10^{16}$-$10^{18}$ Ohm*cm. However the distribution of the electrical field when HVDC is applied in such insulators is nearly impossible due to extreme electrical stress. Without being bound to theory it is believed that the electrical processes in the material can be described as a sum of resistivity and capacity, whereby capacity of the electrical charges leads to a polarization in polymers on the electron or atom or molecular level and results in the formation of space and surface charges. Spontaneous discharge can cause failure of cable joint.

The electrical stress under AC and DC conditions differs significantly. Therefore insulator materials useful for alternating current cannot easily be used for direct current as well in particular in high voltage applications (HVDC).

Insulating materials with lower dielectric constant are exposed to higher stress under AC conditions whereas materials with lower electrical conductivity are exposed to higher stress under DC conditions.

For the manufacture of e.g. cable joints with direct contact and shared interface to shielded or conductive or semi-conductive cable insulating materials the dielectric parameters for a joint material have to be selected or adjusted carefully.

Therefore modified materials such as field gradient insulator comprising non-linear resistivity are introduced but are not easily too handle and apply and are expensive.

STATE OF THE ART

EP 1425760 describes a method for the preparation of a conductive liquid silicone rubber composition with a comparatively high volume resistivity useful as parts of electro-photographic machines such as photocopiers and printers.

In order to overcome some problems of electrical stress and polarization inside of high voltage DC insulators many proposals have been made. One group comprises multilayered materials, wherein each different layer has different dielectric constants or different resistivity. In majority inventors and authors of the prior art applied non-linear or field gradient materials e.g. in WO 2008-076058 A1 where a volume resistivity in a range between 0.5 to 10 kV/mm which decreases from $10^{12}$ to $10^{8}$ Ohm*cm is disclosed. Conductive or semi-conductive fillers have been used in higher concentrations up to 40 wt.-% and more in order to achieve this non-linear behavior of resistivity.

On the design side such insulating materials showing a volume resistivity of about $10^{10}$ Ohm*cm and semi-conductive properties were combined sometimes with a second conductive layer. The disadvantage of such concepts is the need to adjust the semi-conductive field gradient fillers in terms of appropriate particle size and dielectric properties to each individual thermoplastic or rubber material. In addition the mechanical properties such as sufficient mechanical strength and elongation for the assembling of a joint under deformation onto an insulated cable suffer significantly. Cable joints having such materials can get destroyed under assembling. Furthermore the level of electrical resistivity is too low for the use this material as sole material for an insulation. On the other hand if the pure materials without dielectric fillers are used as final insulation having a sufficient high electrical resistivity such insulations materials do not withstand high voltage direct current conditions of more than 1 kV/mm over many days. This has been observed also for silicone rubber insulators applied under HVDC conditions.

It was therefore an ongoing need to find insulation materials, in particular, for field grading assemblies, having appropriate mechanical properties and sufficient electrical resistivity and strength in the presences of the given dielectric constants for high voltage direct current conditions, in particular, for high-voltage direct current power cable applications.

SUMMARY OF THE INVENTION

This objective has been solved by the provision of the composition as set forth in the following.

The inventors have surprisingly discovered silicone compositions which provide a good balance between mechanical properties and sufficient electrical resistivity for silicone rubbers. The inventors found in addition a method to optimize the amount of dielectric active compounds in these rubbers in such a way that these compositions are suitable materials for the manufacture of stretchable elastic deformable cable joints, cable terminations other insulation accessories. According to the present invention an "optimized amount" of a dielectric active compound is preferably an amount which results in a silicone composition which provides a good insulation property (volume resistivity $>1*10^{11}$ Ohm*cm) but at the same time provides a very small conductivity such that the volume resistivity is preferably kept below $10^{16}$ Ohm*cm, in order to minimize the high electric stresses in HVDC applications, even if used as an insulator for example in cable accessory assemblies, in particular, in addition to possible field grading materials in such cable accessory assemblies. The use of the silicone composition of the invention therefore surprisingly contributes to the reduction of electrical stress in HVDC applications and thereby to the increase of the life time of the HVDC cable system. In addition the silicone composition provides a low temperature coefficient of resistivity and the cured silicone composition is at the same time elastic and stretchable (elongation bigger than 200%). Due to the selected materials these insulations provide a high level of flame retardancy, track resistance as well and can be applied at a voltage of least 150 kV DC and withstand electric strength of DC of more than 30 kV/mm.

The silicone composition of the invention can be shaped and moulded to parts of insulation accessories. These insulation accessories can efficiently be produced, e.g. by injection moulding or pouring processes.

TECHNICAL SOLUTION—DETAILED DESCRIPTION

This invention discloses silicone compositions having a high electrical resistivity at a low temperature coefficient under high voltage of direct current (HVDC) conditions. It is a characteristic for the inventive material that electrical resistivity is on a higher level than for known field gradient materials although including the same base polymer.

The inventive composition also provides in a preferred embodiment a non-halogen-containing flame-retardant polyorganosiloxane composition. The invention provides in addition a process for the manufacture of cable accessories, like cable joints, cable terminations and cable connectors for the application under HVDC. Furthermore the invention discloses a method for the determination of the optimal amount of the dielectric active compounds in the insulation material. Such method circumvents the expensive way and time consuming method of test under real conditions at the finished article.

In accordance with the present invention there is provided the use of a silicone composition which composition comprises:

a) 100 pt·wt. of at least one polyorganopolysiloxane having alkenyl groups,
b) 0-100 pt·wt. of a crosslinker component comprising one or more polyorganohydrogensiloxane,
c) 0-100 pt·wt. of a filler component comprising one or more reinforcing silicas or resins,
d) >0.1-2 pt·wt. of at least one dielectric active compound,
e) a curing catalyst selected from the group consisting of 0-1000 ppm of a compound enabling hydrosilylation and 0.1 to 2 wt.-% of an organic peroxide each related to the sum of the amounts of the components a) to d), and
f) 0-50 pt·wt. of one or more auxiliary additives.

for the manufacture of an insulator for high voltage direct current (HVDC) applications.

In this application the term "high voltage direct current (HVDC) applications" refers to direct current applications applying a voltage greater than 36 kV, preferably greater than 50 kV, more preferably greater than 100 kV, still more preferably greater than 150 kV, still more preferably greater than 200 kV, still more preferably greater than 250 kV, still more preferably greater than 300 kV, still more preferably greater than 350 kV.

For the use in the present invention the silicone composition is cured under the assistance of heat or light.

In a preferred embodiment of the invention component a) is a polyorganosiloxane having organic substituents R selected from the group consisting of alkyl, phenyl, and trifluoropropyl groups and substituents $R^1$ selected form the group consisting of alkenyl, such as vinyl groups, and an average degree of polymerisation ($P_n$) between 100 to 12000 siloxy units.

In a preferred embodiment of the invention the optional crosslinker component b) is selected from the group consisting of polyorganohydrogensiloxanes comprising units of the formula RHSiO and $R_2HSiO_{0.5}$ and having a concentration of SiH units of 1 to 100 mol. % related to all siloxane units of the polyorganohydrogensiloxane of component b), and wherein R is as defined above.

In a preferred embodiment of the invention the filler component c) is selected from the group consisting of fumed silicas having a surface area according to BET of 50 to 400 $m^2/g$.

In a preferred embodiment of the invention the dielectric active compound d) is selected from the group consisting of conductive or semi-conductive fillers.

The dielectric active compound d) is preferably selected from the group consisting of carbon black, graphite, graphenes, fullerenes, carbon nanotubes; oxides, carbides, ferrites or spinets of Ti, Al, Zn, Fe, Mn, Mo, Ag, Bi, Zr, Ta, B, Sr, Ba, Ca, Mg, Na, K, and Si; and inorganic salts, such as chlorides, sulfates thereof; and ionic liquids and ionic polymers. More preferably the dielectric active compound d) is selected from the group consisting of carbon black, graphite, carbon nanotubes; oxides, carbides, ferrites of Ti, Al, Zn, Fe, and Si; ionic liquids and ionic polymers. Most preferably the dielectric active compound d) is carbon black. Still more preferably the dielectric active compound d) is exclusively carbon black. In a preferred embodiment the silicone composition comprises less than 5 wt-% ZnO, more preferably less than 1 wt-% ZnO, and even more preferably the silicone composition does not comprise ZnO.

In a preferred embodiment the dielectric active compound d) is a conductive filler having a BET surface of 30 to 1000 $m^2/g$ and an average particle size of $D_{50}$ between 0.001 to 50 μm.

In a preferred embodiment the dielectric active compound d) is a conductive carbon black having a BET surface of >30 $m^2/g$ and an average particle size of $D_{50}$ between 5 to 500 nm.

In another preferred embodiment the component d) can be an ionic polymer or an ionic liquid selected from the group consisting of organic compounds or polymers comprising ammonium, phosphonium, carboxylic, phosphate or sulfonate groups.

In a preferred embodiment of the invention the curing catalyst e) is a compound enabling hydrosilylation selected from hydrosilylation catalysts selected from the group consisting of metals or metal compounds of Pt, Pd, Rh, Co, Ni, Ir or Ru.

In a preferred embodiment of the invention the curing catalyst e) is an organic peroxide selected from the group consisting of substituted or unsubstituted dialkyl-, alkylaroyl-, diaroyl-peroxides.

In a further preferred embodiment of the invention the auxiliary additives f) are selected from the group consisting of pigments, adhesion promotors, plasticizers, flame retardant additives, and process aids for the filler treatment.

In accordance with the present invention the insulator formed by the cured silicone composition preferably has a volume resistivity in the range of 25 to 90° C. at an electric field of 10 kV/mm to 30 kV/mm of more than $1*10^{11}$ Ohm*cm, preferably more than $1*10^{12}$ Ohm*cm, more preferably more than $1*10^{13}$ Ohm*cm, still more preferably more than $1*10^{14}$ Ohm*cm. The insulator provided in accordance with the present invention is normally different from field grading materials, having generally a lower volume resistivity and a non-linear dependency of the volume resistivity and the applied electric field. Accordingly the insulator provided in accordance with the present invention normally acts in field grading assemblies as an insulator not as a field grading material. However, the insulator provided in accordance with the present invention may act in specific field grading assemblies, like in particular in resistive field grading materials as a layer providing field grading properties. If used together with field grading materials the silicone composition of the invention has a composition different from the field grading material. In a preferred embodiment of the invention there is provided a field grading assembly comprising the insulator of the cured silicone composition and field grading materials also formed of a cured silicone composition having a different composition, providing in particular a higher conductivity or lower volume resistivity than the insulator silicon composition.

In a further preferred embodiment of the invention there is provided a silicone composition, which is obtained by curing a composition comprising:

a) 100 pt·wt. of at least one polyorganopolysiloxane having alkenyl groups,
b) 0-100 pt·wt. of a crosslinker component comprising one or more polyorganohydrogensiloxane,
c) 0-100 pt·wt. of a filler component comprising one or more reinforcing silicas or resins,
d) >0.1-2 pt·wt. of at least one dielectric active compound,
e) a curing catalyst selected from the group consisting of 0-1000 ppm of a compound enabling hydrosilylation and 0.1 to 2 wt.-% of an organic peroxide each related to the sum of the amounts of the components a) to d), and
f) 0-50 pt·wt. of one or more auxiliary additives, said silicone composition having a temperature dependency of the volume resistivity in the range of 25 to 90° C. at an electric field of 10 kV/mm to 30 kV/mm, such that the ratio of the maximum volume resistivity and the minimum volume resistivity in that range is <10, and the volume resistivity in the range of 25 to 90° C. at an electric field of 10 kV/mm to 30 kV/mm is between 1*10" and $1*10^{16}$ Ohm*cm, preferably between $1*10^{12}$ Ohm*cm and $1*10^{16}$ Ohm*cm, more preferably between $1*10^{13}$ Ohm*cm and $1*10^{16}$ Ohm*cm, still more preferably between $1*10^{14}$ Ohm*cm and $1*10^{16}$ Ohm*cm, and most preferably between$*10^{15}$ Ohm*cm and $1*10^{16}$ Ohm*cm.

The feature of the temperature dependency of the volume resistivity in the range of 25 to 90° C. at an electric field of 10 kV/mm to 30 kV/mm, such that the ratio of the maximum volume resistivity and the minimum volume resistivity in that range is <10 means that the volume resistivity of the cured silicone composition of the invention is almost constant in the range of 25 to 90° C. at an electric field of 10 kV/mm to 30 kV/mm, i.e. does not vary by more than one decimal power or factor 10. Having this property the cured silicone composition of the invention best suited for an insulator for high voltage direct current (HVDC) applications contributing to the avoidance of electrical stress in high voltage direct current cables, or cable accessories.

In a further preferred embodiment of the invention there is provided a cured silicone composition having a volume resistivity in the range of 25 to 90° C. at an electric field of 10 kV/mm to 30 kV/mm of between $1'10^{13}$ and $1'10^{1'}$ Ohm*cm, more preferably having a volume resistivity in the range of 25 to 90° C. at an electric field of 10 kV/mm to 30 kV/mm of between $1*10^{14}$ and $1*10^{16}$ Ohm*cm and most preferably having a volume resistivity in the range of 25 to 90° C. at an electric field of 10 kV/mm to 30 kV/mm of between $1*10^{15}$ and $1*10^{16}$ Ohm*cm.

In a further preferred embodiment of the invention there is provided a cured silicone composition, having a temperature dependency of the volume resistivity in the range of 25 to 90° C. at an electric field of 10 kV/mm to 30 kV/mm, such that the ratio of the maximum volume resistivity and the minimum volume resistivity is <9.0, more preferably <8.5, more preferably <8.0, more preferably <7.5, more preferably <7.0, more preferably <6.0, still more preferably <5.0.

In a further preferred embodiment of the invention there is provided a cured silicone composition, which is used for the reduction of the electrical stress in high voltage direct current (HVDC) applications. As described above the cured silicone composition of the invention is usually used as an insulator in high voltage direct current (HVDC) applications. Even as an insulator it contributes to the reduction of electrical stress in high voltage direct current (HVDC) applications. The cured silicone composition can be also used in field grading assemblies for high voltage direct current (HVDC) applications, where it essentially or exclusively acts in insulating layers as insulator which further contribute to electrical stress reduction in addition to the field grading materials. In certain cases it may act also as field grading material, in particular, in resistive field grading assemblies.

The cured silicone composition in accordance with the present invention can be used in the construction of all kinds of field grading assemblies, like geometric, capacitive, refractive, resistive or non-linear field grading assemblies for high voltage direct current (HVDC) applications.

The cured silicone composition in accordance with the present invention can be used preferably for high-voltage direct current power cable applications.

In accordance with the present invention there is further provided a method for the manufacture of an insulator or a field grading assembly, comprising said insulator, for high voltage direct current (HVDC) applications, comprising the steps of:

A) shaping the uncured silicone composition by extrusion through a nozzle or by a mould and
B) curing the shaped composition by heat or light to form a shaped insulator or a field grading assembly, comprising said insulator.

In a preferred embodiment of such method curing is carried out in contact with at least one further material, so as to form a composite material comprising the insulator. The at least one further material can be for example a field grading material having a composition different from the silicone composition.

In a further embodiment of the invention there is provided an insulator or a field grading assembly comprising said insulator for high voltage direct current application which is obtained by curing the silicone composition as described herein.

In a further embodiment of the invention there is provided a cable accessory for high voltage direct current applications comprising the insulator, or the field grading assembly, as described before. The cable accessory for high voltage direct current applications according to the invention is preferably selected from the group consisting of cable joints, cable terminations and cable connectors. In a preferred embodiment the cable joint seals the ends of cables having a thermoplastic polyolefin or rubber cable insulation. The present invention further provides a method for the manufacture of a cable joint or a cable termination as described before, which method comprises the steps of:

A1) providing a conductive shaped silicone composition, which differs from the silicone composition according to the invention, which conductive shaped silicone composition is optionally cured, B1) encapsulating at least a part of the surface of the conductive shaped silicone composition of step A1) with the silicone composition according to the invention, as described herein, in a mold to form and cure a cable joint or cable termination.

The present invention further provides a method for sealing and/or insulating connected cables or closing cable ends by the use of the cable joint as described before, comprising the steps of j) providing an insulated wire having a thermoplastic or elastomer multi-layered sheath appropriate for direct current insulation and naked wire or connectors, jj) encapsulating naked wire or connectors by putting over onto the surface of the insulating sheath of j) the holes of a tube-like previously moulded and cured cable joint as described before under mechanical extension of the joint in such a way that an overlap between the shaped silicone cable joint and the sheath onto the wire insulation of about more than 0.5 cm is achieved whereby the silicone cable joint seals the sheathed insulation of the insulated wire by mechanical pressure of the relaxed joint forming an encapsulating insulation also for the naked wire and connectors.

The present invention further provides a method for the determination of the optimum amount of the dielectric active compound in a cured silicone composition for the use as high voltage direct current insulator comprising the steps i) measuring the temperature dependency of the volume resistivity between 25 to 90° C. in an interval of the electric field of between 10 kV/mm to 30 kV/mm for said cured silicone composition, ii) adjusting the concentration of a dielectric active compound in said cured silicon composition such that the ratio of the maximum volume resistivity and the minimum volume resistivity in said range of 25 to 90° C. at an electric field of 10 kV/mm to 30 kV/mm, is at least <10, and that the volume resistivity in the range of 25 to 90° C. at an electric field of 10 kV/mm to 30 kV/mm is between $1*10^{11}$ and $1*10^{16}$ Ohm*cm, preferably between $1*10^{12}$ Ohm*cm and $1*10^{16}$ Ohm*cm, more preferably between $1*10^{13}$ Ohm*cm and $1*10^{16}$ Ohm*cm, still more preferably between $1*10^{14}$ Ohm*cm and $1*10^{16}$ Ohm*cm and most preferably between $1*10^{15}$ Ohm*cm and $1*10^{16}$ Ohm*cm.

In a preferred embodiment of said method for the determination of the optimum amount of a dielectric active compound in a cured silicone composition, the concentration of a dielectric active compound in the cured silicon composition is adjusted such that the ratio of the maximum volume resistivity and the minimum volume resistivity becomes minimal. The following paragraphs describe the invention in more detail.

In one preferred embodiment the composition satisfies the requirement for High Voltage DC-insulators and may pass test such as tracking resistance test of 4.5 and 6 kV according to IEC 60587 and flame retardancy according to UL94 (V-0) due to the presence of platinum and carbon black or oxides of Co, Ti, Mn or Fe and the like.

Although a broad range of dielectric active compounds can be used in the inventive composition it is preferred to choose defined dielectric active materials which have a minimum of negative impact on the mechanical and chemical properties e.g. depoly-merisation of siloxane polymers. Another selection criteria is the cost aspect for conductive materials with a defined nano-sized structure.

A general definition of the dielectric active compounds is shown below for component d). The preferred materials are conductive fillers such as carbon black, graphenes, fullerenes, carbon nanotubes and some oxides.

The inventive silicone composition has a high electrical resistivity or volume resistivity, respectively although the conductive dielectric active compounds are incorporated. These properties could be discovered by the method for evaluation of lowest possible temperature coefficient in the electrical field/stress for a necessary level of electrical volume resistivity of more than $1*10^{11}$ Ohm*cm preferably more than $1*10^{12}$ Ohm*cm, most preferably more than $1*10^{13}$ Ohm*cm.

The preferred base polymers for the insulator material of the invention are polyorganosiloxanes since this material provides a lot of efficient process options. Suitable polyorganosiloxanes of component a) of the composition according to the present invention preferably can be selected from the group of polyorganosiloxanes which appropriate in terms of viscosity and chain length for the manufacture of Liquid Silicone Rubber (LSR), 2 part/component Room Temperature Vulcanizing (RTV) and High Consistency Rubbers. The cured silicone rubber compositions like Liquid Silicone Rubber (LSR) or 2 part Room Temperature Vulcanizing RTV 2K or High Consistency Rubbers (HCR) provide preferably the following general properties:

Hardness according to DIN 53505: 20-60° Shore A
Tensile strength according to DIN 53504 S2: 4.5-12 N/mm$^2$
Tear according to ASTM D 624 die B:10-30 N/mm
Elongation according to DIN 53504 S2: 200-800%
Contact angle (to water) 100 to 160°
Arc Resistance 100-400 seconds
Dielectric Strength 15-50 kV/mm according to DIN 53481
Breakdown voltage between 60 to 1000 kV/mm DC conditions
Volume resistivity according to DIN 53452: $1*10^{11}$ to $1*10^{18}$ [Ohm*cm]; preferred $1*10^{12}$ to $1*10^{16}$ [Ohm*cm]
Dielectric constant according to DIN 53483 50 Hz: 2.-3.5

In particular Liquid Silicone Rubber (LSR) or 2 parts Room Temperature Vulcanizing RTV 2K are showing very low viscosities and high cure rates.

The preferred composition for cable accessories like cable joints comprises Liquid Silicone Rubbers (LSR), preferably having a viscosity at 20° C. (measured at a shear rate of $D=10\ s^{-1}$) of less than 5 kPa·s, preferably of less than 2 kPa·s, more preferably a viscosity between 7-2 000 Pa·s at 20° C.

The inventive concept comprises the addition of the dielectric active compound over a master batch, i.e. a 3$^{rd}$ colorbatch part/component is applied to achieve the inventive composition e.g. in a usual 2 part LSR process.

The further inventive method for the determination of the optimum amount of a dielectric active compound in a silicone composition for the use as high voltage direct current insulator comprises the steps i) measuring the temperature dependence of the volume resistivity between 25 to 100° C. for interval between 10 kV/mm to 30 kV/mm, ii) finding the minimum decrease of the volume resistivity which is smaller than one decade/factor of 3 for a volume resistivity at a level in a range between $1*10^{11}$ and $1*10^{16}$ Ohm*cm, iii) determine the related concentration of the dielectric active compound for that minimum detected in step ii).

In a preferred embodiment the inventive materials provides a volume resistivity of more than $1*10^{11}$ Ohm*cm preferably more than $1*10^{12}$ Ohm*cm, most preferably more than $1*10^{13}$ Ohm*cm. This method enables a determination of the temperature coefficient of the volume resistivity. It could be confirmed under practical tests that such materials having high volume resistivity and a low temperature coefficient of the volume resistivity can best withstand high electrical stress of more than 150 kV applied onto a real cable joint. The method can be applied to determine the optimum concentration of the dielectric active compound. It was surprisingly found that a low amount of the dielectric active compound allows creating a silicone composition which has a sufficient high volume resistivity in order to serve as insulator and has as well a relative low temperature dependency/low temperature coefficient. Such properties have been found to be crucial for the HVDC resistance of cable accessories. The inventive composition suitable for HVDC application can be defined as defined in the following.

The inventive method for the manufacture of an insulator comprising the use of a silicone composition as insulator material which comprises a) 100 pt·wt. of at least one polyorganopolysiloxane having alkenyl groups,
b) 0-100 p·wt. of a crosslinker component comprising one or more polyorganohydrogensiloxane,
c) 0-100 p·wt. of a filler component comprising one or more reinforcing silicas or resins,
d) >0.1-2 pt·wt. of at least one dielectric active compounds
e) a curing catalyst selected from the group which consists of 0-1000 ppm of a compound enabling hydrosilylation and 0.1 to 2 wt.-% of an organic peroxide related to the sum of a) to d)
f) 0-50 pt·wt. of one or more auxiliary additives.
and the curing of the composition is effected under assistance of heat or light.

In a preferred embodiment the insulator is for use in high voltage direct current (HVDC) application.

Component a) Polymer

The inventive composition comprises a base polymer as component a) which is a polyorganosiloxane selected preferably from the group of one or more polymethylsiloxanes having organic substituents R selected form the group which consists of alkyl, phenyl, and trifluoropropyl groups and $R^1$ selected from the group which consists of alkenyl, such as vinyl groups, and an average degree of polymerisation ($P_c$) between 100 to 12000 siloxy units, calculated in particular from the number average molecular weight which may be determined by GPC measurement versus polystyrene standard, following in particular the procedure according to ASTM D5296-11.

The inventive silicone composition comprises at least one polyorganosiloxane as component a) having alkenyl groups, preferably in average at least two alkenyl groups. Suitable components a) may be described by the general formula (I), $$(M_a D_b T_c Q_d R^2_e)_m \qquad (I)$$

wherein the indices in formula (I) represent the ratios of the siloxy units M, D, T and Q, which may be distributed blockwise or randomly in the polyorganosiloxane. Within a polyorganosiloxane each siloxane unit may be identical or different and a=0-10
b=0-12000
c=0-50
d=0-1
e=0-300
m=1-1000, wherein the indices a, b, c, d and m being such that the viscosity of component a) at 20° C. is less than 50 kPa·s (measured at a shear rate of $D=1\ s^{-1}$ at 20° C.), whereby not all indices of a to e can be 0, preferably (a+b) is >0, The viscosity of component a) refers to the viscosity of a single component a) or a mixture of components a). The latter case of the mixture includes the presence of individual components a1) and a2) that may have a viscosity exceeding 50 kPa·s at 20 C, for example resinous components a3) that comprise Q and or T units.

In formula (I) the sum of indices should represent the average polymerisation degree $P_n$ based on the average number molecular mass Mn.

In the formula (I):

$M=R_3SiO_{1/2}$, or M*
$D=R_2SiO_{2/2}$, or D*
$T=RSiO_{3/2}$, or T*
$Q=SiO_{4/2}$,
divalent $R^2$, which are bridging groups between siloxy groups above, wherein each R, which may be the same or different, and each be an organic group, which is preferably selected from optionally substituted alkyl with up to 12 carbon atoms, optionally substituted aryl with up to 12 carbon atoms, the groups R being free of aliphatic unsaturation, and wherein

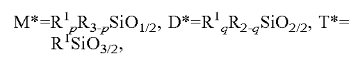
$$M^*=R^1_pR_{3-p}SiO_{1/2},\ D^*=R^1_qR_{2-q}SiO_{2/2},\ T^*=R^1SiO_{3/2},$$

wherein p=0-3, preferably 1-3,
q=1-2, and
$R^2$ is as defined above.

R is preferably selected from n-$C_1$-$C_{12}$-, iso-$C_3$-$C_{12}$-, or tertiary-$C_4$-$C_{12}$-alkyl, alkoxyalkyl, $C_5$-$C_{12}$-cyclic alkyl, or $C_6$-$C_{12}$-aryl, alkylaryl, which groups may be substituted in addition by one or more O-, Cl-, CN- or F-atom, or poly ($C_2$-$C_4$)-alkylene ethers with up to 500 alkylene oxy units the groups R being free of aliphatic unsaturation, Examples of suitable monovalent hydrocarbon radicals include alkyl radicals, preferably such as $CH_3$—, $CH_3CH_2$—, $(CH_3)_2CH$—, $C_8H_{17}$— and $C_{10}H_{21}$—, and cycloaliphatic radicals, such as cyclohexylethyl, aryl radicals, such as phenyl, tolyl, xylyl, aralkyl radicals, such as benzyl, 2-phenylethyl and 2-phenylpropyl. Preferable monovalent halohydrocarbon radicals have the formula $C_nF_{2n+1}CH_2CH_2$— wherein n has a value of from 1 to 10, such as, for example, $CF_3CH_2CH_2$—, $C_4F_9CH_2CH_2$—, $C_6F_{13}CH_2CH_2$—, $C_2F_5$—$O(CF_2$—$CF_2$—$O)_{1-10}CF_2$—, $F(CF(CF_3)$—$CF_2$—$O)_{1-5}$—$(CF_2)_{0-2}$—, $C_3F_7$—$OCF(CF_3)$— and $C_3F_7$—$OCF(CF_3)$—$CF_2$—$OCF(CF_3)$—.

The preferred groups for R in the polyorganosiloxane a) of the inventive composition are selected form the group which consists of methyl, phenyl, 3,3,3-trifluoropropyl groups.

$R^1$ is selected from unsaturated groups, comprising C═C-group-containing groups (alkenyl groups), e.g.: n-$C_2$-$C_{14}$-, iso-$C_3$-$C_{14}$-, or tertiary-$C_4$-$C_{14}$-alkenyl or $C_6$-$C_{14}$-cyclic alkenyl, $C_6$-$C_{14}$-cycloalkenyl, $C_8$-$C_{14}$-alkenylaryl, cycloalkenylalkyl, vinyl, allyl, methallyl, 3-butenyl, 5-hexenyl, 7-octenyl, ethyliden-norbornyl, styryl, vinylphenylethyl, norbornenyl-ethyl, limonenyl, optionally substituted by one or more O- or F-atoms, or C≡C-group-containing groups (alkinyl groups), optionally comprising one or more O- or F-atoms. The alkenyl radicals are preferable attached to terminal silicon atoms; the olefin function is at the end of the alkenyl group of the higher alkenyl radicals, because of the more ready availability of the alpha-, omega-dienes used to prepare the alkenylsiloxanes.

Preferred groups for $R^1$ are vinyl, allyl, 5-hexenyl, cyclohexenyl, limonyl, styryl, vinylphenylethyl.

The group $R^2$ includes for example divalent aliphatic or aromatic n-, iso-, tertiary- or cyclo-alkylene with up to 14 carbon atoms, arylene or alkylenearyl groups. $R^2$ forms bridging elements between two siloxy units. The content of the $R^2$ groups does not exceed 30 mol. % preferably not exceed 20 mol. % of all siloxy units. Preferably $R^2$ is absent. Preferred examples of suitable divalent hydrocarbon groups $R^2$ include any alkylene residue, preferably such as $—CH_2—$, $—CH_2CH_2—$, $—CH_2(CH_3)CH—$, $—(CH_2)_4—$, $—CH_2CH(CH_3)CH_2—$, $—(CH_2)_6—$, $—(CH_2)_8—$ and $—(CH_2)_{18}—$; cycloalkylene radical, such as cyclohexylene; arylene radicals, such as phenylene, xylene and combinations of hydrocarbon radicals, such as benzylene, i.e. $—CH_2CH_2—C_6H_4—CH_2CH_2—$, $—C_6H_4CH_2—$. Preferred groups are alpha, omega-ethylene, alpha, omega-hexylene, 1,4-phenylene or 1,4-ethylenephenyl.

Further examples include divalent halohydrocarbon radicals $R^2$ e.g. any divalent hydrocarbon group $R^2$ wherein one or more hydrogen atoms have been replaced by halogen, such as fluorine, chlorine or bromine. Preferable divalent halohydrocarbon residues have the formula $—CH_2CH_2(CF_2)_{1-10}CH_2CH_2—$ such as for example, $—CH_2CH_2CF_2CF_2CH_2CH_2—$ or other examples of suitable divalent hydrocarbon ether radicals and halohydrocarbon ether radicals including $—CH_2CH_2OCH_2CH_2—$, $—C_6H_4—O—C_6H_4—$, $—CH_2CH_2CF_2OCF_2CH_2CH_2—$, and $—CH_2CH_2OCH_2CH_2CH_2—$.

Such polymers as component a) comprising R, $R^1$ and/or $R^2$ radicals are e.g. alkenyl-dimethylsiloxy or trimethylsiloxy terminated polydimethylsiloxanes, which may contain other siloxane units than alkenylmethylsiloxy groups dimethylsiloxy groups such as poly(dimethyl-co-diphenyl)siloxanes.

Broadly stated component a) of the compositions of this invention may be any polyorganosiloxane compound containing two or more silicon atoms linked by oxygen and/or divalent groups $R^2$ wherein the silicon is bonded to 0 to 3 monovalent groups per silicon atom, with the proviso that the polyorganosiloxane compound contains at least two silicon-bonded unsaturated hydrocarbon residues including olefinic radicals and acetylenic radicals.

The siloxane units with radicals R and/or $R^1$ may be equal or different for each silicon atom. In a preferred embodiment the structure is $$R^1_pR_{3-p}SiO(R_2SiO)_{m1}(R^1RSiO)_nSiR^1_pR_{3-p} \quad (1)$$

p=0-3, preferably 1, m1=0-12000, preferably 10-6000, more preferred 100-1000 n=0-5000 preferably 3-2000, more preferred 5-500.

One preferred polyorganosiloxane component a) for the composition of this invention is a substantially linear polyorganosiloxane a1). The expression "substantially linear" includes polyorganosiloxanes a1) that do not contain more than 0.2 mol. % (trace amounts) of siloxy units of the type T or Q. This means the polymer a) is preferably a linear, flowable fluid a1):

$$R^1_pR_{3-p}SiO(R_2SiO)_{m1}SiR_{3-p}R_p^1 \quad (1a)$$

wherein $R^1$, R, p and m1 are as defined above, with the proviso, that there are at least two alkenyl groups per molecule.

Preferred structures include

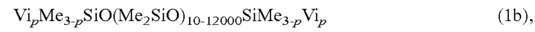

$$Vi_pMe_{3-p}SiO(Me_2SiO)_{10-12000}SiMe_{3-p}Vi_p \quad (1b),$$

$$PhMeViSiO(Me_2SiO)_{10-12000}SiPhMeVi \quad (1c),$$

In the group of alkenyl comprising siloxanes a) the addition of a second or third siloxane as component a2) and/or a3) is preferred. The purpose of component a2) and a3) so-called vinyl rich polymers is to modify mechanical properties and crosslinking density.

Polymers suitable for LSR (Liquid Silicone Rubber) are selected from the group of siloxane polymers with $P_n$ of 100 to 2000 siloxy units, those for HCR are preferably selected from the group of siloxane polymers with $P_n$ of 2000 to 12000 siloxy units.

The polymers a2) are selected either from the group consisting of polymers of the formulas (1d) to (1i), i.e. linear polyorganosiloxanes having additional alkenyl side groups wherein the concentration of T- and Q-groups are below 0.2 mol. % or polyorganosiloxanes having a higher concentration of T- and Q-groups than the previous polymer types a1) or a2).

The polymers a2) are represented by the formulas 1d)-1f)

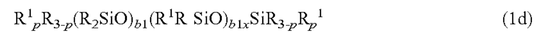

$$R^1_pR_{3-p}(R_2SiO)_{b1}(R^1R\ SiO)_{b1x}SiR_{3-p}R_p^1 \quad (1d)$$

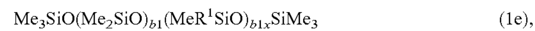

$$Me_3SiO(Me_2SiO)_{b1}(MeR^1SiO)_{b1x}SiMe_3 \quad (1e),$$

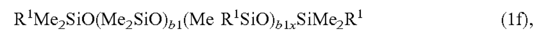

$$R^1Me_2SiO(Me_2SiO)_{b1}(Me\ R^1SiO)_{b1x}SiMe_2R^1 \quad (1f),$$

whereby b1=>0-12000 b1x=0-5000 b1+b1x=>10-12000

$R^1$, R, p are as defined above, $R^1$=preferably vinyl, allyl, hexenyl, cyclohexenyl, limonyl, styryl, vinylphenylethyl. Preferred groups for R are methyl, phenyl, 3,3,3-trifluoropropyl.

Other preferred structures of a2) are $$Vi_pMe_{3-p}SiO(Me_2SiO)_{10-12000}(MeViSiO)_{1-4000}SiMe_{3-p}Vi_p \quad (1g),$$

$$Me_3SiO(Me_2SiO)_{10-12000}(MeViSiO)_{1-4000}SiMe_3 \quad (1h),$$

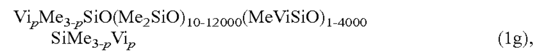

$$PhMeViSiO(Me_2SiO)_{10-12000}(MePhSiO)_{1-4000}SiPhMeVi \quad (1i)$$ and wherein Me=methyl, Vi=vinyl, Ph=phenyl, and p=0 to 3, preferred p=1.

The third component of polymer a), branched polymers a3), are preferably selected from those of the formula (Ia) wherein the polyorganosiloxane a3) comprising alkenyl groups have more than 0.2 mol. % of $T=RSiO_{3/2}$ or $Q=SiO_{4/2}$-units.

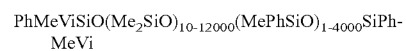

$$(M_{0.4-4}D_{0-1000}T_{0-50}Q_{0-1})_{1-1000} \quad (1a)$$

whereby $M=R_3SiO_{1/2}$, or M*

$D=R_2SiO_{2/2}$, or D*

$T=RSiO_{3/2}$, or T*

$Q=SiO_{4/2}$ as defined above, wherein M*, D* and T* are as defined above, carrying unsaturated groups $R^1$. The amount of such M*, D* and T* units is preferably 0.001 to 20 mol. %, more preferably 0.01 to 15 mol. %, most preferably 0.1 to 10 mol. % based on all siloxy units.

The range of the sub-indices defines a range of the possible average polymerization degrees $P_n$ according to the number average molecular weight $M_n$.

The indices relate to suitable viscosities as defined later on and describe polymers without any solvent for a viscosity adjustment.

The preferred branched polyorganosiloxanes a2) and a3) have usually a higher concentration of unsaturated groups $R^1$. Branched polymers a3) are described e.g. in U.S. Pat. No. 5,109,095. Preferably the branched vinyl-rich polymers a3) are soluble in xylene >10 wt. % resin and have a range of D:T>10:1 preferably >33:1 and/or respectively (M:Q)=(0.5 to 4):1, such as e.g.

$$(M_{0.7}M^*_{0.05}Q)_{10\text{-}500} \quad (1j).$$

All these polymers may be prepared by any of the conventional methods for preparing triorganosiloxane-terminated polydiorganosiloxanes. For example, a proper ratio of the appropriate hydrolyzable silanes, e.g., vinyldimethylchlorosilane, trimethylchlorosilane, tetrachlorosilane, methyltrichlorosilane and dimethyldichlorosilane, or its corresponding alkoxysilanes, may be co-hydrolyzed and condensed. Other reaction routes may run alternately over equilibration reactions of 1,3-divinyltetraorganodisiloxane, e.g. symmetrical divinyldimethyldiphenylsiloxane or divinyltetramethylsiloxane, which furnishes the endgroups of the polydiorganosiloxane, which may be equilibrated with an appropriate polydiorganosiloxane, e.g., octamethylcyclotetrasiloxane, in the presence of an acidic or basic catalyst.

The vinyl-rich polymers in particular the branched polymers having MQ or MDQ structures and Si-alkenyl or SiH groups. Such branched polymers can replace the filler component c) partly or completely and provide nevertheless high mechanical reinforcement. This could be an additional option to reduce viscosity and modify electrical properties.

In a preferred embodiment the polymer component a) is a mixture of polymers of the formula (Ia) and/or of the formula (1d) and/or (1j) whereby the mixture has an alkenyl content in average of preferably below 2 mol. % of all siloxy units of the mixture a), whereby polymer a1) is present in a higher amount than a2) or a3).

The viscosities of the polydiorganosiloxanes a) which are defined above for the purposes of this invention, are preferably essentially free of cyclic polydiorganosiloxanes (less than 1 wt. %, more preferably 0.5 wt. % measured for 1 h at 150 C and 20 mbar) portion of the polyorganosiloxane.

The average polymerization degree $P_n$ of the siloxane units (M, D, T, Q) of the polyorganosiloxane a) measured by GPC measurement versus polystyrene standard based on the average number molecular weight Mn is preferably in the range of $P_n$>10 to 12000, the more preferred range is 40 to 6000. The viscosities of such polymers are in the range of 10 to $100*10^6$ mPa·s at 20° C. at a shear rate of D=10 $s^{-1}$, more preferred 10 to $50*10^6$ mPa·s, more preferred 100 to $20*10^6$ mPa·s.

For so-called High Consistency Rubbers the related polymer (gum) viscosity is between 5-100 kPa·s at 20° C. at a shear rate of D=1 $s^{-1}$. In case of polydimethylsiloxanes this relates roughly to $P_n$ values of 3000-12000 siloxy units.

In the preferred embodiment of Liquid Silicone Rubber (LSR) compositions it is preferred to use viscosities of less than 1 kPa·s; with respect to polydimethylsiloxanes this relates roughly to $P_n$ values of <2500 siloxy units. In both embodiments vinyl functionalized polydimethylsiloxanes are preferred.

The viscosity of the polyorganosiloxane a) for this embodiment is preferably 100 to $300*10^3$ mPa·s at 20° C. at a shear rate of D=10 $s^{-1}$ and the $P_n$ is >10 to 2500.

In a preferred embodiment for an LSR polymer a) or a mixture of e.g. 2-4 polymers of component a) the blend has a viscosity of less than 200,000 mPa·s at 20° C. at a shear rate of D=10 $s^{-1}$, in order to ensure a sufficiently low viscosity for liquid silicone rubber composition. Such a low viscosity is an assumption and is advantageous for the manufacture of compositions comprising reinforcing fillers and processing these compositions in a LSR injection molding process.

The alkenyl content of the components a) may be determined here by way of $^1H$ NMR—see A. L. Smith (ed.): The Analytical Chemistry of Silicones, J. Wiley & Sons 1991 Vol. 112 pp. 356 et seq. in Chemical Analysis ed. by J. D. Winefordner.

Crosslinker Component b)

In a preferred embodiment the inventive polyorganosiloxane composition is cured by a hydrosilylation reaction and then comprises one or more polyorganohydrogensiloxanes b) as a crosslinker. In such a case the organic peroxide component e) as crosslinking initiator is preferably omitted.

The inventive composition comprises a crosslinker component b) which is selected from the group of polyorganohydrogensiloxanes comprising preferably units of the formula RHSiO and $R_2HSiO_{0.5}$ and a concentration of SiH units of 1 to 100 mol. % related to all siloxane units, whereby R is defined above and preferably methyl or phenyl.

The component b) is at least one polyorganohydrogensiloxane having at least two Si—H-groups. Suitable polyorganohydrogensiloxanes b) comprising SiH units may be formally described by the general formula (II), $$(M^1_{a2}D^1_{b2}T^1_{c2}Q_{d2}R^2_{e2})_{m2} \quad (II)$$

wherein the siloxy units $M^1$=M, as defined above, or M, $D^1$=D, as defined above, or D, $T^1$=T, as defined above, or T, Q as defined above, R as defined above, $M^{}=HR_2SiO_{1/2}$, $D^{}=HRSiO_{2/2}$, $T^{}=HSiO_{3/2}$, a2=0.01-10 preferably =2-5, most preferably =2 b2=0-1000 preferably =10-500 c2=0-50 preferably =0 d2=0-1 preferably =0 or 1, most preferably =0 e2=0-3 preferably =0 m2=1-1000, preferably =1-500, most preferably =1-20, whereby not all indices of a to e can be 0, preferably (a+b) is =>0, with the proviso that in the general formula (II) at least two SiH-containing siloxy units selected from M, D and T** are present.

Preferably the polyorganohydrogensiloxanes b) have in average at least four, preferably at least five, still more preferably at least six silicon atoms.

The siloxy units may be distributed blockwise or randomly in the polymer chain.

The aforementioned indices should represent the average polymerization degree $P_n$ based on the average number molecular mass Mn as described before.

The range for M-, D-, T- and Q-units present in the molecule may cover nearly all values representing fluids, flowable polymers, liquid and solid resins. It is preferred to use liquid linear, cyclic or branched siloxanes. Optionally these siloxanes may comprise additionally traces of $C_1$-$C_6$-alkoxy or Si-hydroxy groups remaining from the synthesis.

Preferred structures of component b) in the compositions of this invention are siloxanes of formula (2a) to (2e).

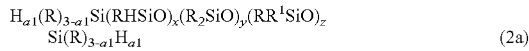

$$H_{a1}(R)_{3-a1}Si(RHSiO)_x(R_2SiO)_y(RR^1SiO)_z Si(R)_{3-a1}H_{a1} \quad (2a)$$

more specifically:

$$HR_2SiO(R_2SiO)_y(RR^1SiO)_z(RHSiO)_zSiR_2H \quad (2b)$$

$$HMe_2SIO(Me_2SiO)_y(RR^1SiO)_z(MeHSiO)_xSiMe_2H \quad (2c)$$

$$Me_3SiO(MeHSiO)_xSiMe_3 \quad (2d)$$

$$\{(HRSiO)_v(R_2SiO)_w\} \quad (2e)$$

wherein R and $R^1$ are as defined above, R is preferably methyl and/or phenyl, $R^1$ is preferably vinyl, and index 'a1' is 0-1, preferably 0, and x=2-1000, preferably =2-500, y=0-650, preferably =0-100, z=0-65, preferably =0 preferably 3<x+y+z<1000, more preferably 4<x+y+z<650, v is 2 to 7, w is 0 to 3,

3≤v+w≤7.

Furthermore resinous polyorganohydrogensiloxanes of the following formula are possible:

$$\{(T^1)(R^4O_{1/2})_{n2}\}_{m2} \quad (2f)$$

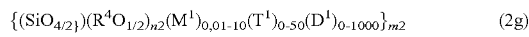

$$\{(SiO_{4/2})\}(R^4O_{1/2})_{n2}(M^1)_{0,01-10}(T^1)_{0-50}(D^1)_{0-1000}\}_{m2} \quad (2g)$$

wherein $T^1$, $M^1$, $D^1$ are as defined above, n2=0 to 3 m2 is as defined above $R^4$ is hydrogen, $C_1$-$C_{25}$-alkyl, such as methyl, ethyl, n-propyl, iso-propyl, n-, iso- and tert.-butyl, alkanoyl, such acyl, aryl, —N=CHR, such as butanonoxime, alkenyl, such as propenyl.

One preferred embodiment of the compounds (2g) is provided by way of example by monomeric to polymeric compounds which may be described via the formula $((Me_2HSiO_{0.5})_kSiO_{4/2})_{1-1000}$ wherein index k is from 0.3 to 4. Such liquid or resinous molecules may contain significant concentrations of SiOH— and/or ($C_1$-$C_6$)-alkoxy-Si groups of up to 10 mol. % related to the silicon atoms.

Specific examples of preferred suitable compounds for component b) in the compositions of this invention include $$Me_3SiO\text{-}(MeHSiO)_{2-650}\text{—}SiMe_3,$$

$$(MeHSiO)_{4-7},$$

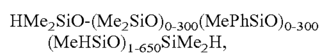

$$HMe_2SiO\text{-}(Me_2SiO)_{0-300}(MePhSiO)_{0-300}(MeHSiO)_{1-650}SiMe_2H,$$

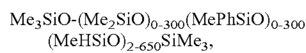

$$Me_3SiO\text{-}(Me_2SiO)_{0-300}(MePhSiO)_{0-300}(MeHSiO)_{2-650}SiMe_3,$$

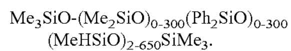

$$Me_3SiO\text{-}(Me_2SiO)_{0-300}(Ph_2SiO)_{0-300}(MeHSiO)_{2-650}SiMe_3.$$

The component b) may be used as a single component of one polyorganosiloxane polymer or mixtures thereof.

If an increase of the cure rate is required, it is preferred to use some polyorganopolysiloxanes b) having $HMe_2SiO_{0,5}$— units or homo MeHSiO-polymers to adjust the cure rate to shorter times.

The component b) has preferably a viscosity at 20° C. from 2 to 1000 mPa·s.

Preferably the crosslinker b) should have at least more than 3 reactive SiH-groups per molecule. So-called chain extenders having in average of >1 to 3 reactive SiH-groups per molecule may be present in addition.

The molar ratio of the total of SiH groups in component b) to the total of the unsaturated hydrocarbyl residues $R^1$ in component a) and if present in b) in the formulation is between 0.7 and 15, preferably 0.8. to 8, more preferably 1.0 to 7, most preferably is 1.0 to 4. It is further preferred to use polyorganohydrogensiloxanes wherein the molar ratio of $R_2SiO$:RHSiO units is >1.

The preferred R groups in the polyorganohydrogensiloxanes are methyl, phenyl and 3,3,3-trifluoropropyl. The preferred viscosities are below 1000 mPa·s, more preferred below 400 mPa·s at 20° C.

Component c) Reinforcing Filler

The inventive composition comprises at least one filler component c) which is selected from the group of fumed silicas having a surface area according to BET of 50 to 400 $m^2$/g. The fumed silicas are, if appropriate surface-modified, reinforcing fillers c). Reinforcing fillers c) are characterized by a BET surface area of 50 $m^2$/g or more and primary particle size of <50 nm. In the context of the present invention the component d) is not comprised by the reinforcing filler c).

Preferably these fillers are surface-hydrophobized. If component c) is used, its amount is preferably up to 100 parts by weight, preferably from 0 to 60 parts by weight, even more preferably from 0 to 50 parts by weight, even more preferably from 5 to 30 parts by weight based on 100 parts by weight of component a).

Fillers having BET surface areas of above 50 $m^2$/g permit the production of silicone elastomers with improved mechanical properties. In view of strength, electrical resistivity and flame retardancy fumed silicas are preferred, and even more preferred silicas are, for example, Aerosil® 200, 300, 400, HDK® N20 or T30, Cab-O-Sil® MS7 or HS5 having more than 200 $m^2$/g BET surface area, supplied by Evonik (formerly Degussa), Wacker or Cabot and others.

The fillers c) may be subject of any suitable conventional surface-treatment with suitable surface-treatment agents belonging to reactive silanes or siloxanes as auxiliary additives f). Preferred silanes or siloxanes for the surface treatment are preferably for example silazanes, such as hexamethyldisilazane and/or 1,3-divinyl-tetra-methyldisilazane, in the presence of water, in a preferred embodiment it may take place by an 'in-situ'-hydrophobization of the filler surface. In other embodiments it may also take place with other familiar filler-treatment agents such as poly-organosiloxanediols whose chain lengths are from 2 to 50 and which bear unsaturated organic radicals.

The agent for filler treatment may provide reactive sites for the crosslinking reaction.

In case of the preferred embodiment of liquid silicone rubbers the treatment with hexaorganodisilazanes and water and its reaction products is preferred.

Examples of commercially available silicas pre-hydrophobized with various silanes are: Aerosil R 972, R 974, R 976, or R 812, or, for example, HDK 2000 or H30. Rheological properties, i.e. technical processing properties, of the non-cured silicone rubber mixtures may be influenced by the selection the amount of the type of the filler, its amount, and the nature of hydrophobization.

Other fillers named semi- or non-reinforcing fillers which include by way of example all of the fine-particle fillers whose particles size are smaller than 100 μm having a BET surface of <50 $m^2/g$ are counted under component f) as auxiliary additives or used as component d).

Component d) Dielectric Active Compounds

The specific dielectric properties of the inventive composition are mainly related to the dielectric active compounds d) wherein at least one dielectric active compound d) is selected from the group of conductive or semi-conductive fillers which comprises carbon black, graphite, graphenes, fullerenes, carbon nanotubes, oxides, carbides, ferrites or spinels of Ti, Al, Zn, Fe, Mn, Mo, Ag, Bi, Zr, Ta, B, Sr, Ba, Ca, Mg, Na, K, Si, inorganic salts, such as chlorides, sulfates thereof and are selected from the group of ionic liquids and ionic polymers.

The amount of the dielectric active compounds, in particular the carbon black amount, per 100 weight parts of the at least one polyorganopolysiloxane having alkenyl groups a) is >0.1-2 pt·wt., preferably >0.15-2 pt·wt.

more preferably >0.2-1.5 pt·wt. and still more preferably >0.3-1 pt·wt.

The particulate dielectric active compounds have preferably an average diameter $D_{50}$ from 5 to 500 nm, preferred 5 to 200 nm.

$D_{50}$ is measured by light scattering according to ISO 22412:2008. Particles with a diameter according to grit sieve analysis of more than 125 μm should be below 10 wt. % in particular in pellet materials.

The other compounds suitable under d) are ionic liquids and ionic polymers which are selected from the group consisting of compounds comprising ammonium, phosphonium, carboxylic, phosphate or sulfonate groups and counter ions such as cations or anions.

In a most preferred embodiment of the invention the composition the at least one dielectric active compound d) is a conductive carbon black, preferably furnace carbon black, i.e. manufactured by the furnace black process.

In order to achieve suitable dielectric activity for the purpose of the present invention, preferably superconductive carbon blacks with very high purity are used, which can be used in the form of pellets, having preferably at least one or more of the following properties:

- a BET surface area of >100 to 1500 $m^2/g$, more preferably >100 to 1400 $m^2/g$, more preferably >100 to 1000 $m^2/g$, more preferably >250 to 1000 $m^2/g$, more preferably >500 to 1000 $m^2/g$, and/or
- a particle size of $D_{50}$ between 5 to 500 nm, more preferably 10 to 200 nm, and/or
- a DBP pore volume 300-600 ml/100 g, more preferably 300-550 ml/100 g, more preferably 300-400 ml/100 g, and/or
- iodine adsorption 700-1200 mg/g, more preferably 700-1150 mg/g, more preferably 700-1000 mg/g, more preferably 700-900 mg/g, and/or
- pH 8-11, more preferably pH 9-11, more preferably pH 9-10.5 and/or
- metal content <50 ppm, and/or
- sulphur content <150 ppm, and/or
- water content <0.5 wt. %, and/or
- volatiles content <1 wt. %, and/or
- fines <125 micron in pellets <10 wt.-%, and/or
- grit content: <50 mg/kg, and/or
- ash content: <0.1 wt.-%.

The average particle size $D_{50}$ is, in particular, determined by laser 'Dynamic Light Scattering with a Malvern Zetasizer which also known as photon correlation spectroscopy or quasi-elastic light scattering following ISO 13320-1.

Preferably the concentration of the dielectric active compounds, preferably the carbon black concentration is from 0.01 weight percent (wt %) to 1.96 weight percent, preferably 0.05 to 1.90 wt %, more preferred 0.1 to 1.8 wt. %, more preferred 0.15 to 1.7 wt. %, more preferred 0.2 to 1.5 wt. %, more preferred 0.3 to 1.0 wt. %, more preferred 0.3 to 0.7 wt. %, related to all components a) to f) of the composition, in particular the total weight of the composition.

Not only the chemical composition and electric properties of the filler component d) has an important impact of the electric properties of the inventive compositions, but also the filler size and its distribution as well as the distribution in the polymer matrix. Since dielectrics are exposed to an enormous electrical stress under High Voltage Direct Current conditions, bulk and surface defects, contaminations can lead to spontaneous discharges and failure of the insulation properties of the inventive composition. The lower the particle size the higher the surface area and the closer the interaction between the polymer and the particles of the dielectric active compound d). Any contaminations or impurities act mostly as single particles having chemical and electric characteristics different to the polymer matrix, present in low concentration and not continuously distributed through the bulk phase of the siloxane polymer. Improvement of dielectric properties with regard to HVDC conditions can be achieved with particles having a narrow size distribution and which are homogeneously dispersed in the continuous matrix polymer. The inventors found that the preferred filler particle size is preferably from 5 to 500 nm.

Other preferred dielectric active component d) are selected from the group of titanium dioxide ($TiO_2$), iron and zinc, oxides in particular of spinels and ferrites as well as wet or precipitated silicas. In a preferred embodiment the use of ZnO is not preferred.

Such fillers must provide comparable properties of particles size, size distribution, surface area, dispersability like carbon black. The fillers should have a BET surface of >30 $m^2/g$.

The primary particle size is a number average particle size D50 which may be preferably determined using an electron microscope and by evaluation of the average diameter of the ball-like particles/crystallites in cross-sectional images of cut surfaces of resin-embedded particles. Also applicable is the Degussa-Evonik method 665/T990.

The preferred titanium dioxides have BET surface range of 35-300 $m^2/g$ and particles sizes below 30 nm. For example fumed $TiO_2$ P25 (Degussa-Evonik) has a number average primary particle size of 21 nm and a BET surface of 50 $m^2/g$. Another $TiO_2$-type is a precipitated anatase (Kronos 7050) has e.g. a BET surface of about 225 $m^2/g$ and a number average primary particle/crystallite size of 15 nm, The use of $TiO_2$ or $Fe_3O_4$ as component d) are helpful to enhance the effect on flame retardancy achieved by the crosslinking catalysts based on Pt compounds as component e).

In accordance with the present invention the amount and kind of the dielectric active compound d) is suitably adjusted such that the inventive cured silicone composition has the desired electrical properties as insulator for the high voltage direct current (HVDC) applications, in particular such that the insulator has a volume resistivity in the range of 25 to 90° C. at an electric field of 10 kV/mm to 30 kV/mm of more than $110^{11}$ Ohm*cm, preferably more than $1*10^{12}$ Ohm*cm, more preferably more than $110^{13}$ Ohm*cm, still more preferably more than $110^{14}$ Ohm*cm, and preferably at most $1*10^{16}$ Ohm*cm. Furthermore in accordance with the present invention the amount and kind of the dielectric active compound d) is suitably adjusted such that the inventive cured silicone composition has a temperature dependency of the volume resistivity in the range of 25 to 90° C. at an electric field of 10 kV/mm to 30 kV/mm, such that the ratio of the maximum volume resistivity and the minimum volume resistivity is <10, and/or the volume resistivity in the range of 25 to 90° C. at an electric field of 10 kV/mm to 30 kV/mm is between $1*10^{11}$ and $1*10^{16}$ Ohm*cm, preferably between $1*10^{13}$ and $1*10^{16}$ Ohm*cm, more preferably between $1*10^{14}$ and $1*10^{16}$ Ohm*cm, and most preferably between $1*10^{15}$ and $1*10^{16}$ Ohm*cm.

Process for the Finished Products d): Master Batch

The dielectric active compound must be dispersed in well-defined amounts and defined pattern in the base polysiloxane polymer component a).

It is therefore preferred to add the component d) in form of a so-called master batch.

This master batch facilitates the dosage of small amounts and dispersion of the component d) which is crucial for the dielectric effect of the invention.

In particular for Liquid Silicone Rubber (LSR) compositions a master batch is necessary having a viscosity of less than 100 Pa·s (20° C., measured at a shear rate of $D=10\ s^{-1}$) since the multi-component dosage and mixing units in the injection molding process need this low consistency. For example such batches are used by admixing of an additional component in e.g. a two component process technology for LSR. In such a process the master batch should not exceed more than 15 wt. % of said two components, preferably not exceed 4 wt. %. This additive batch must comprise all additives at the highest possible concentrations but must still provide a viscosity below 100 Pa·s (20° C., measured at a shear rate of $D=10\ s^{-1}$) and must be stable against sedimentation. In a preferred embodiment the manufacture of the master batch process comprises the dispersion of component d) at temperatures between 20 to 200° C. on a 3 roll mill, a kneader or dissolver in the base polymer component a) optionally together with filler component c), whereby the concentration is preferably between 3 to 40 wt. % of component d) in a) or a) and c).

Component e) Crosslinking Catalyst

In one preferred embodiment the curing catalyst is selected from the group which consists of 0-1000 ppm (related to the sum of the weight amounts of the components a) to d)) of a compound enabling curing by a hydrosilylation reaction.

The curing catalyst e) applied as hydrosilylation catalyst in the invention is selected from the group which consists of metals or metal compounds of Pt, Pd, Rh, Co, Ni, Ir or Ru.

The inventive composition contains preferably platinum or at least one platinum compound e) which is acting as a curing catalyst if component b), the SiH-polyorganosiloxane is present and optionally necessary for the required flame retardancy.

The possible Pt component e) may be selected for example from usual platinum catalysts components e.g. selected from the group of organo platinum compounds, salts or metals of platinum, with or without a solid carrier such as activated charcoal, carbon, silica powders as taught e.g. in U.S. Pat. Nos. 3,159,601; 3,159,662; 3,419,593; 3,715,334; 3,775,452 and 3,814,730.

The curing reaction by hydrosilylation may of course be initiated by other metals or metal compounds known by people skilled in the art. Other metals may comprise metals or metal compounds of Pd, Rh, Co, Ni, Ir or Ru.

Suitable platinum compounds also include photo-activatable catalysts, including (η-diolefin)-(sigma-aryl)-platinum complexes (see e.g. U.S. Pat. No. 4,530,879 or US 2003/0199603), $\eta^5$cyclopentadienyl platinum complex compounds or complexes with optionally substituted cyclopentadienyl ligands having sigma-bonded ligands, preferably sigma-bonded alkyl or aryl ligands. Other platinum compounds whose reactivity may be controlled by way for example using azodi-carboxylic esters, as disclosed in U.S. Pat. No. 4,640,939 or diketonates may be used also in principle. Platinum compounds capable of being photo-activated that may be used are moreover those selected from the group having ligands selected from diketones. Other Pt-catalysts are mentioned by way of example in U.S. Pat. No. 3,715,334 or 3,419,593, EP 1 672 031 A1 and Lewis, Colborn, Grade, Bryant, Sumpter, and Scott in Organometallics, 1995, 14, 2202-2213, all hereby incorporated by reference in this invention.

The component e) if used for the hydrosilylation reaction of the inventive composition acts a catalyst compound, which catalyzes the reaction of the silicon-bonded hydrogen atoms of component b) with the silicon-bonded olefinic hydrocarbon substituents of component a). The metal or organo metal compound may be any catalytically active metal and is generally a platinum group metal-containing a catalytic active component. Preferably, the metal of component e) is any platinum complex compound.

A typical platinum containing catalyst component in the polyorganosiloxane compositions of this invention is any form of platinum (0), (II) or (IV) compounds which are able to form complexes with phosphites. Preferred complexes are $Pt\text{-}^{(0)}$-alkenyl complexes, such alkenyl, cycloalkenyl, alkenylsiloxane such vinylsiloxane, because of its easy dispersibility in polyorganosiloxane compositions.

A particularly useful form of the platinum complexes are the $Pt^{(0)}$-complexes with aliphatically unsaturated organosilicon compound such as 1,3-divinyltetramethyldi-siloxane (Vinyl-$M_2$ or Karstedt catalyst), as disclosed by U.S. Pat. No. 3,419,593 incorporated herein by reference are especially preferred, cyclohexene-Pt, cyclooctadiene-Pt and tetravinyl-tetramethyl-tetracyclosiloxane (Vinyl-$D_4$). Such catalysts possess best dispersibility in the inventive composition(s).

$Pt^0$-olefin complexes are prepared by way of example in the presence of 1,3-divinyl-tetramethyldisiloxane ($M^{Vi}{}_2$) via reduction of hexachloroplatinic acid or of other platinum chlorides by the way of example by alcohols in the presence of basic compounds such as alkali carbonates or hydroxides (hydrazine reduction products of Pt(IV) and Pt(II) can also be used).

The amount of platinum-containing catalyst component that is used in the compositions of this invention as flame retardant additive is limited by two constraints.

On the one side the amount should provide the desired flame resistance on the other side the amount should be as low as possible for cost reasons and balancing reactivity and pot-life under storage.

Therefore it is preferred to provide a polyorganosiloxane composition wherein the platinum concentration is between 10 to 100 ppm, preferably 14-70 ppm, more preferably 15-38 ppm (based on metal related to component a) to f)).

Generally the reactivity of the Pt-catalyst must be controlled in terms of curing time by so-called inhibitors defined as auxiliary additives under component f).

In another embodiment of the invention the curing catalyst e) is selected from the group of 0.1 to 2 wt.-% of an organic peroxide related to a) to f), whereby such organic peroxide is selected from the group which consists of substituted or unsubstituted dialkyl-, alkylaroyl-, diaroyl-peroxides.

Suitable peroxides are peroxides commonly used in High Consistency Silicone Rubber (HCR, HV, HTV) selected from the group of dialkyl-, alkylaroyl, diaroyl peroxides. Preferred peroxides are all peroxides having a half-life period which allows storing mixtures of the inventive polyorganosiloxane composition comprising that peroxide at 25° C. for at least more than 10 days preferably more than 30 days without scorching. Scorching means premature curing i.e. either the increase of the Mooney viscosity of more than 20 Mooney units or gelling that is the increase of the loss modulus G" measured in a rheometer up to the level of the elastic modulus G'.

The reactivity for the preferred peroxides is such that the curing of the polymethyl- or polymethylvinylsiloxanes occurs within less than 15 min at a temperature below 180° C. Preferred examples of such curing agents are organic peroxides such as bis-benzoyl peroxide, bis o-methyl or p-methyl benzoylperoxide, bis-2,3-, bis-2,4- or bis-2,5-dichloro-benzoyl peroxide, di-tert.-butyl peroxide, preferably used for pressure-less hot air vulcani-zation and peroxides such as e.g. butyl perbenzoate, dicumyl peroxide α,α'-di-(t-butylper-oxy)di-isopropylbenzenes and 2,5-bis-(tert.-butylperoxy)-2,5-dimethylhexane for transfer or injection molding under pressure.

The HCR silicone compositions can also be cured with component b) and a hydrosilylation catalyst. In view of flame retardancy it is preferred to use Pt hydrosilylation catalyst as dual additive not only as crosslinking catalyst but also to improve flame retardancy.

Component f) Auxiliary Additives

Optionally the inventive composition can comprise auxiliary additives f) which are selected from the group consisting of pigments, adhesion promotors, plasticizers, flame retardant additives, and process aids for the filler treatment.

Adhesion Promotors

In one embodiment the flame retardant polyorganosiloxane comprises at least one adhesion promotor. These compounds improve the ability of the inventive composition to adhere onto several surfaces of substrates such as metals, thermoplastic or duromeric plastic surfaces, glass, natural or synthetic textile fibers other ceramic substrates.

The adhesion promotors are preferably employed in amount of 0.1 to 2 wt. % related to component a). Some of the crosslinkers b) may work as adhesion promotor if they exhibit substituents like e.g. aryl, acryl, methylacryl or epoxy groups beside the SiH units. Also some of the nitrogen compounds f) may act as adhesion promotors in particular if alkoxysilyl groups are present.

One preferred class of adhesion promotors is selected from the group which consists of silanes of the formula (3)

$$X—(CR^9{}_2)_e—Y—(CH_2)_eSiR^9{}_d(OR^8)_{3-d} \quad (3)$$

wherein

X is selected from the group consisting of halogen, pseudohalogen, unsaturated aliphatic group with up to 14 carbon atoms, epoxy-group-containing aliphatic group with up to 14 carbon atoms, cyanurate-containing group, and an isocyanurate-containing group, Y is selected from the group consisting of a single bond, a heteroatomic group selected from —COO—, —O—, —S—, —CONH—, —HN—CO—NH—, $R^9$ is selected from hydrogen and R as defined above, $R^8$ is a C1-C8 alkyl group is 0, 1 to 8, and may be identical or different, d is 0, 1 to 2.

Preferred examples of the adhesion promotor off) include: gamma-glycidyloxypropyltrialkoxysilanes, (3,4-epoxycyclohexyl)alkyltrialkoxy silanes methacryloxyypropyltrialkoxysilanes, isocyanatopropyltrialkoxysilanes, isocyanatomethyl-trialkoxysilanes and vinyltrialkoxysilanes.

Other optional auxiliary additives are used in an amount of 0-15 pt·wt. per 100 pt·wt. of component a). The auxiliary or conventional additives include e.g.: plasticizers, release oils, hydrophobizing oils, such as polydimethylsiloxane, polydiphenyldimethylsiloxane oils having a viscosity that is preferably 0.001-10 Pa·s at 20° C.

Furthermore it can be desired to color the layer if present in particular as outer layer with inorganic or organic pigments with lowest amount of pigments, since very often these pigments weaken or impair the mechanical or electrical properties. Additional mould-release or flow improving agents may also be used, examples being fatty acid derivatives or fatty alcohol derivatives, fluoroalkyl surfactants. Compounds advantageously used in this invention are those, which separate rapidly and migrate to the surfaces. Stability after exposure to hot air may by way of example be increased using known hot-air stabilizers, such as Fe-, Mn-, Ti-, Ce- or La-compounds, and organic salts, preferably their organic complexes such as di- or tri-ketonates.

Furthermore the auxiliary additives f) can include hydrophobizing agents for the treatment of reinforcement filler components c) and d), e.g. organosilanols or organosilazane and water, for example trimethylsilanol, vinyldimethylsilanol, hexamethyldisilazane, 1,3-divinyltetramethyldisilazane.

The auxiliary additives may also include so-called inhibitors for controlling the hydrosilylation crosslinking reaction. In case where the composition contains all ingredients for a hydrosilylation reaction i.e. alkenyl groups of a), SiH groups of b) and platinum or its compounds, the reactions speed should be preferably controlled by inhibitors in order to avoid premature curing of the reactive composition at 25° C. before the desired curing and or shaping step for the manufacture of coatings or moulded articles. Inhibitors useful in hydrosilylation reactions are well-known. Examples of advantageous inhibitors include for example vinylsiloxanes, 1,3-divinyltetramethyl-disiloxane, or tetravinyl-tetramethyl-tetracyclosiloxanes. It is also possible to use other known inhibitors, for example alkynols such as ethynylcyclohexanol, 3-methylbutynol, dimethylmaleate, alkyl-, aryl or alkylaryl-phosphines, alkyl-, aryl- or alkylaryl phosphites or alkyl-, aryl-amines are used in accordance with the invention interact with those Pt-compounds, thereby influencing the hydrosilylation activity of the catalyst to provide an excellent balance between storage stability on the one hand and reactivity at elevated temperatures upon curing.

In order to increase the flame retardancy it is preferred to use nitrogen or phosphoric compounds which can enhance the effect of Pt compounds. These flame retardant additives are selected form the group of azo, hydrazo, triazole, tetrazole, guanidine, melamine, urea or phosphite derivatives.

Other Extending Fillers or Pigments:

The auxiliary additives may also include other extending fillers. Such other fillers are different from the dielectric active compound d). But its use is less preferred with respect to inaction with component d). Additional pigments or extending fillers should only be incorporated as long as they do not interact or impair or suspend the dielectric properties of component d).

Therefore extending fillers or pigments can only merely be employed since they may have immediately similar effects as component d) or interact with d). Concentration must be therefore if used below 1 wt. % preferably smaller than 0.1 wt. %.

Typical organic pigments are selected e.g. from the group of perylenes, phthalocyanines organic pigments.

Extending fillers can be selected from the group which consists of silicates, diatomaceous earth, grounds silica, quartz, micas, amorphous carbonates, borates, hydroxi-des/oxides and oxides of Al, Ca, Mg, Fe, Zn having particle sizes above those of component d). These abrasive fillers and pigments are preferably semi- or non-reinforcing fillers or pigments whose particle sizes are between 1 to 100 μm having a BET surface of <30 $m^2/g$.

Since many of these fillers are in addition very often abrasive towards metal nozzles and surfaces in an injection moulding or mixing machine or moulds most of these fillers are omitted for several other reasons. It is part of the inventive concept that the concentration of abrasive fillers should be as low possible in order to increase the life-time of the nozzles in injection molding machines and mold itself. Such abrasive fillers may be tolerated if not abrasive to metal surfaces of nozzles in the injection molding process, but in principle these fillers should be avoided or be less than 3 pt·wt. per component a). Abrasive fillers like ground quartz or cristobalite powders or diatomaceous earth are generally less preferred.

All of the inventive compositions are curable by any of the processes known in silicone technology and the related processes for the manufacture of formed shaped articles. The cured material of the inventive compositions are elastomers for the use in the manufacture of an insulator for high voltage direct current application. Preferably the inventive composition is formed and cured before the assembling of the cable joint or termination with the cable but in general the curing step can be carried out at any point of time in the process chain of assembling cable accessories, i.e. curing and shaping must not happen at the same time.

The invention relates also to a method for the manufacture of insulators useful for the application in high voltage application, whereby the inventive composition is shaped by extrusion through a nozzle or by a mould and curing the shaped composition by heat or light to form a shaped insulator is optionally carried out in the presence of at least one other silicone material which differs from the inventive composition. Such different other materials may be silicone, rubber or thermoplastic materials which at least differ in terms of the physical properties and ratios and/or concentrations of the single components a) to f).

The inventive composition can be used per se as insulating material but preferably is used in combination with other materials well known in the design of HVDC cable accessories. For example cable joints or cable terminations have very often a multi-layer design, whereby at least one of the materials providing high conductivity is part of the joint as shielding material, e.g. conductive EPDM or conductive silicone rubber or conductive thermoplastic having a volume resistivity below $1*10^4$ Ohm*cm. Some parts of such cable accessories can have the form of a tube or tube-like trumpet and can therefore be manufactured by an extrusion process.

The final insulator needs very often a more complicated assembling of 2 to 4 different materials and therefore is manufactured by assembling of extruded and moulded parts, sometimes the final outer layer is applied as encapsulant by pouring of low viscous silicone rubbers in particular for joints with a big volume under assistance of a optionally open mold cavity.

The inventive composition is preferably for the use as cured composition for high voltage direct current application and preferably for the manufacture of cable joints, boots, sleeves, fittings etc. cable accessories, cable terminations.

The cured inventive composition is in particular for the use of the manufacture of a cable joint intended for sealing cable ends of one or more cables having a thermoplastic polyolefin or rubber cable insulation, wherein the cable joint seals cable ends of one or more cables having a thermoplastic polyolefin or rubber cable insulation.

The invention relates also to a method for the manufacture of a cable joint comprising the steps A1) providing at least one conductive shaped silicone composition which differs from the silicone composition according to the invention and which is optionally cured, B1) encapsulating the composition of step A1) with a silicone composition according to the invention in a mold to form and cure a cable joint or cable termination.

The invention relates furthermore to a method for sealing and/or insulating connected cables or closing cable ends by the use of a cable joint as defined before comprising the steps of j) providing an insulated wire having a thermoplastic or elastomer multi-layered sheath appropriate for direct current insulation and parts of naked wire or connectors, jj) encapsulating naked or connected wire by putting over onto the surface of an insulating sheath of j)) the holes of a tube-like previously moulded and cured cable joint according as defined before under mechanical extension of the joint in such a way that an overlap between the shaped silicone cable joint and the sheath onto the wire insulation of about more than 0.5 cm is achieved whereby the silicone cable joint seals the sheathed insulation of the insulated wire by mechanical pressure of the relaxed joint forming an encapsulating insulation also for the naked wire and connectors This assembling process i.e. the sealing step of one or more insulated cables can be carried out in a way wherein the cable joint or cable termination is stretched by widening the tube-like holes under assistance of pressed air or by stent-like plastic or a metal tool or by means which keep the joint in an extended shape and let it relax under heat like as a shrinking tube.

Another process includes the use of an optional transparent form and start curing after encapsulation of the cable or cables with all materials in the field at temperatures between 0 to 200° C. or under assistance of light and light activatable curing catalysts e).

PREFERRED EMBODIMENTS OF THE INVENTION

Embodiment A

A polyorganosiloxane composition, comprising a) 100 pt·wt. of at least one polydimethylsiloxane having more than 2 alkenyl groups, b) 0-10 p·wt. of a crosslinker comprising one or more polyorganohydrogensiloxanes, c) 10-40 p·wt. of a reinforcement filler comprising one or more fumed silica BET 150-400 $m^2/g$, d) >0.1-2 pt·wt. of a dielectric active carbon black e) 5-50 ppm calculated as Pt of Pt-vinyl complex as curing catalyst enabling hydrosilylation related to the total weight of components a) to d) and the curing of this composition under assistance of heat.

Embodiment B

A polyorganosiloxane composition, comprising a) 100 pt·wt. of at least one polydimethylsiloxane having more than 2 alkenyl groups, c) 10-40 p·wt. of one or more fumed silica BET 150-400 $m^2/g$, d) >0.1-2 pt·wt. of a dielectric active carbon black e) 0.1 to 2 wt.-% of an organic peroxide related to the total weight of components a) to d) and the curing of this composition under assistance of heat.

Embodiment C

A polyorganosiloxane composition, comprising a) 100 pt·wt. of at least one polyorganopolysiloxane having alkenyl groups, b) 0-100 pt·wt. of a crosslinker component comprising one or more polyorganohydrogensiloxanes, c) 0-100 pt·wt. of a filler component comprising one or more reinforcing silicas or resins, d) >0.15-2 pt·wt. of at least one dielectric active compound, preferably >0.2-1.5 pt·wt. of at least one dielectric active compound, more preferably >0.3-1 pt·wt. of at least one dielectric active compound, the at least one dielectric active compound being preferably carbon black, preferably exclusively carbon black, e) a curing catalyst selected from the group consisting of 0-1000 ppm of a compound enabling hydrosilylation and 0.1 to 2 wt.-% of an organic peroxide each related to the sum of the weight amounts of the components a) to d), and f) 0-50 pt·wt. of one or more auxiliary additives.

Further preferred embodiments include:

1. Embodiment

A method for the determination of the optimum amount of a dielectric active compound in a silicone composition for the use as high voltage direct current insulator comprising the steps i) measuring the temperature dependence of the volume resistivity between 25 to 100° C. for interval between 10 kV/mm to 30 kV/mm, ii) finding the minimum decrease of the volume resistivity which is smaller than one decade/factor of 3 for a volume resistivity at a level in a range between $1*10^{11}$ and $1*10^{16}$ Ohm*cm, iii) determining the related concentration of the dielectric active compound for that minimum detected in step ii).

2. Embodiment

A method for the manufacture of an insulator comprising using of a silicone composition as insulator material which comprises b) 100 pt·wt. of at least one polyorganopolysiloxane having alkenyl groups, b) 0-100 p·wt. of a crosslinker component comprising one or more polyorganohydrogensiloxane, c) 0-100 p·wt. of a filler component comprising one or more reinforcing silicas or resins, d) >0.1-2 pt·wt. of at least one dielectric active compounds e) a curing catalyst selected from the group which consists of 0-1000 ppm of a compound enabling hydrosilylation and 0.1 to 2 wt.-% of an organic peroxide related to the sum of a) to d)

f) 0-50 pt·wt. of one or more auxiliary additives.

and the curing of the composition is effected under assistance of heat or light.

3. Embodiment

The silicone composition according to Embodiment 2 comprising a base polymer as component a) which is a polyorganosiloxane selected from the group of one or more polymethylsiloxanes having organic substituents R selected from the group which consists of alkyl, phenyl, trifluoropropyl groups and $R^1$ selected form the group consisting of alkenyl, such as vinyl groups, and an average degree of polymerisation $P_n$ between 100 to 12000 siloxy units. 100 to 12000 siloxy units.

4. Embodiment

The silicone composition according to Embodiment 2, whereby the crosslinker component b) is selected from the group consisting of polyorganohydrogensiloxane comprising units of the formula RHSiO and $R_2HSiO_{0.5}$ and a concentration of SiH units of 1 to 100 mol. % related to all siloxane units of polyorganohydrogensiloxane of component b), whereby R is defined in Embodiment 2.

5. Embodiment

The silicone composition according to Embodiment 2, whereby the filler component c) is selected from the group consisting of fumed silicas having a surface area according to BET of 50 to 400 $m^2/g$.

6. Embodiment

The silicone composition according to Embodiment 2, wherein at least one dielectric active compounds d) is selected from the group consisting of conductive or semi-conductive filler which comprises carbon black, graphite, graphemes; fullerenes, carbon nano tubes oxides, carbides, ferrites or spinels of Ti, Al, Zn, Fe, Mn, Mo, Ag, Bi, Zr, Ta, B, Sr, Ba, Ca, Mg, Na, K, Si, inorganic salts, such as chlorides, sulfates thereof and are selected from the group of ionic liquids and ionic polymers.

7. Embodiment

The silicone composition according to Embodiment 6, wherein the at least one dielectric active compound d) is a conductive or semi-conductive filler selected from the group consisting of carbon black, graphite, carbon nano tubes oxides, carbides, ferrites of Ti, Al, Zn, Fe, Si, ionic liquids and ionic polymers.

8. Embodiment

The silicone composition according to Embodiment 6, wherein the at least one dielectric active compound d) is a conductive filler selected from the group which consists of fillers having a BET surface of 30 to 1000 $m^2/g$ and particle size of $D_{50}$ between 0.001 to 50 μm.

9. Embodiment

The silicone composition according to Embodiment 2 or 6, wherein the at least one dielectric active compound d) is a conductive carbon black having a BET surface of >30 $m^2/g$ and particle size of $D_{50}$ between 5 to 500 nm.

10. Embodiment

The silicone composition according to Embodiment 6, wherein the component d) the ionic polymer or the ionic liquid is selected from the group consisting of organic compounds or polymers comprising ammonium, phosphonium, carboxylic, phosphate or sulfonate groups.

11. Embodiment

The silicone composition according to Embodiment 2, wherein the curing catalyst e) is a hydrosilylation catalyst selected from the group consisting of metals or metal compounds of Pt, Pd, Rh, Co, Ni, Ir or Ru.

12. Embodiment

The silicone composition according to Embodiment 2, wherein the curing catalyst e) is an organic peroxide selected from the group consisting of substituted or unsubstituted dialkyl-, alkylaroyl-, diaroyl-peroxides.

13. Embodiment

The silicone composition according to Embodiment 2, wherein the auxiliary additives f) are selected from the group consisting of pigments, adhesion promotors, plasticizers, flame retardant additives, and process aids for the filler treatment.

14. Embodiment

A method for the manufacture of an insulator useful for the application in high voltage application, comprising the steps of A) shaping the silicone composition of Embodiment 2 by extrusion through a nozzle or by a mould and B) curing the shaped composition by heat or light to form a shaped insulator is optionally carried out in the presence of at least one other silicone material which differs from the silicone composition of Embodiment 2.

15. Embodiment

An insulator for high voltage direct current application which is obtained by curing the composition according to any of the Embodiments 2 to 14.

16. Embodiment

A cable accessory, cable joint or cable termination obtained by curing the composition according to any one of the Embodiments 2 to 14.

17. Embodiment

A cable joint according to Embodiment 16, wherein the cable joint seals ends of cables having a thermoplastic polyolefin or rubber cable insulation.

18. Embodiment

A method for the manufacture of a cable joint or a cable termination according to any of the Embodiments 14 to 17 comprising the steps of A1) providing a conductive shaped silicone composition which differs from the silicone composition according to Embodiment 2 and which is optionally cured, B1) encapsulating the composition of step A1) with a composition according to Embodiment 2 in a mold to form and cure a cable joint or cable termination.

19. Embodiment

A method for sealing and/or insulating connected cables or closing cable ends by the use of the cable joint according to any of the Embodiments 16 or 18 comprising the steps of j) providing an insulated wire having a thermoplastic or elastomer multi-layered sheath appropriate for direct current insulation and naked wire or connectors, jj) encapsulating naked or connected wire by putting over onto the surface of an insulating sheath of j) the holes of a tube-like previously moulded and cured cable joint according to any of the Embodiments 2 and 18 under mechanical extension of the joint in such a way that an overlap between the shaped silicone cable joint and the sheath onto the wire insulation of about more than 0.5 cm is achieved whereby the silicone cable joint seals the sheathed insulation of the insulated wire by mechanical pressure of the relaxed joint forming an encapsulating insulation also for the naked wire and connectors.

Test Methods

The tracking resistance test is carried out according to IEC 60587 or ASTM 2303.

The measurements of volume resistivity were conducted according to DIN IEC 60093 or VDE 0303 Part 30 test sheets of 80 mm diameter and thickness of 2 mm.

Break down voltage/strength was measured in unipolar DC breakdown strength test with sphere-sphere electrode system (8 mm diameter). Sample thickness 1.5-2 mm, electrodes immersed in oil in order to avoid surface flash over, whereby the temperature have been adjusted from room temperature to insulation operating temperature of 70° C. Voltage increase 1 kV/sec at 10, 20, and 30 kV/mm Relative dielectric constant was measured according to DIN 53483, or VDE 0303 Part 4.

Further parameters indicated in table 2 are:

Viscosity @25° C. before cure: measured at a shear rate of $D=10\ s^{-1}$

Hardness according to DIN 53505

Tensile strength according to DIN 53504 S2

Elongation: according to DIN 53504 S2

Modulus 50%: according to DIN 53504 S2

Modulus 100%, according to DIN 53504 S2

Modulus 200%, according to DIN 53504 S2

Modulus 300% according to DIN 53504 S2

Surface resistivity: DIN IEC 60093 or equivalent standards

EXAMPLES

Example 1: Preparation of a Master Batch Comprising the Dielectric Active Compound d)

In order to improve the dispersion quality of the carbon black a master batch was produced as follows:

100 kg of a vinyl terminated linear polydimethylsiloxane as component a) having a viscosity of 10 Pa·s at 20° C. was placed in a planetary mixer and mixed with 12.7 kg carbon black Ketjenblack EC 300 J (Akzo) having BET surface 800 $m^2/g$ (350 DBP pore volume ml/100 g) with a primary particle size of 40 nm. This mixture was stirred in a twin blade kneader till a homogeneous mixture was obtained after 45 min.

The homogeneous mixture was then further dispersed over 30 min on a three-roll mill to obtain a much better dispersion of the carbon black. After this treatment all particles in the filler batch show a particle size of smaller than 10 μm by a grindometer evaluation and the mixture had a viscosity at 20° C. of 550-700 Pa·s at a shear rate $D=10^1\ s^{-1}$.

TABLE 1

| Master batch incl. component d) | | |
|---|---|---|
| | | pt. wt. |
| Vinyl terminated PDMS 10 Pa · s (U10) | $M^{Vi}_2D_{540}$ | 88.7 |
| Ketjen Black EC300J-batch (11.3% carbon in U10) | carbon black | 11.3 |
| sum | | 100.0 |

Example 2

2a

A transparent catalyst base compound was produced as follows: 11.8 kg of a vinyl terminated linear polydimethylsiloxane (U10) component a) with a viscosity of 10 Pa's at 20° C., and 21.3 kg of a vinyl terminated linear polydimethylsiloxane component a) with a viscosity of 65 Pa·s at 20° C. were placed in a twin blade kneader and mixed with 3.4 kg of hexamethyldisilazane, 0.03 kg 1,3-divinyltetramethylsilazane, and 1.4 kg of water. Then 17 kg of fumed silica with a BET surface of 300 $m^2/g$ component c) was gradually added at 25-40° C. and mixed in and dispersed under reflux until a uniform mixture was obtained. This mixture was stirred and heated to reflux for 30 minutes. The volatiles were then distilled off at 100° C., then 150° C. for 1 h and by applying subsequently vacuum of 20 mbar pulled for 30 minutes.

The mixture was diluted with 34.4 kg of the above polydimethylsiloxane of 10 Pa·s and 4.2 kg of a linear vinyl terminated polydimethylsiloxane component a2) having vinyl side groups and vinyl concentration of 2 mmol/g having a viscosity of 0.2 Pa·s component a2). Finally 0.21 kg of a platinum vinylsiloxane complex component e) solution of the Karstedt type in vinyl terminated polydimethylsiloxane (1.47% Pt) was admixed.

2b

A transparent crosslinker base compound was produced as follows: 11.9 kg of a vinyl terminated linear polydimethylsiloxane with a viscosity of 10 Pa·s at 20° C., 21.6 kg of a vinyl terminated linear polydimethylsiloxane with a viscosity of 65 Pa·s at 20° C. were placed in a twin blade kneader and mixed with 3.4 kg of hexamethyldisilazane, 0.03 kg 1,3-divinyltetramethylsilazane, and 1.4 kg of water.

Then 23.2 kg of fumed silica with a BET surface of 300 $m^2/g$ were gradually added at 25-40° C. mixed in and dispersed under reflux until a uniform mixture was obtained. This mixture was stirred and heated to reflux for 30 minutes. The volatiles were then distilled off at 100° C., heated to 150° C. for 1 h and by subsequently applying vacuum up to 20 mbar pulled for 30 minutes.

The mixture was diluted with 27.4 kg of the above polydimethylsiloxane of 10 Pa·s, 0.13 kg of an inhibitor 1-ethinyl-2-cyclohexanol (ECH) as component f) and then the mixture was completed with 5.9 kg of $M_2D_{20}D^H_{10}$ a linear polydimethylhydrogenmethylsiloxane component b) and 9.5 kg $M_2D_{100}D^H_{20}$ of a linear polydimethylhydrogenmethylsiloxane at the end of the mixing process.

Example 2c

Compounds of 2a and 2b are mixed in a ratio of 1:1 to form the mixture of example 2c. The mixture has the overall composition after evaporation of the volatiles as shown in table 2.

Example 2d

The inventive composition example 2d is made by addition of 5 pt·wt of example 1 to 95 pt·wt. of example 2c The example 2d comprises therefore about 18 wt. % of silyated $SiO_2$ filler, 0.5 wt. % of carbon black admixed e.g. via a batch with predispersed carbon black as shown in example 1 for a master batch. The molar ratio of SiH:SiVi is 3.3:1. The mixture contains 15.7 ppm platinum and 650 ppm of the inhibitor 1-ethinyl-2-cyclohexanol (ECH). The mixture has a viscosity of 50 Pa·s at a shear rate of D=10 $s^{-1}$. The material has a liquid to pasty consistency. The mechanical properties are reported in table 3.

Example 3

Example 3 was prepared according to the procedure of example 2d. The composition after evaporation of the volatiles is shown in table 2.

Comparative Example 4

Comparative example 4 was prepared according to the procedure of example 2d. The composition after evaporation of the volatiles is shown in table 2.

Test Results

Table 3 is showing all of the test results of mechanical and electrical properties measured for the cured silicone compositions of the examples and comparative example. The compositions were cured in a mould for 10 min at 175° C. in order to achieve test sheets of different thicknesses between 1.5, 2 and 6 mm; the evaluations followed the test standards defined above.

The inventive composition of ex. 2d showed a very small temperature dependency of the volume resistivity in the applied voltage range, which is favourable in particular for the high voltage direct current application in cable joints. It also passed the test in a real cable joint. In particular, the temperature dependency of the volume resistivity in the range of 25 to 90° C. at an electric field of 10 kV/mm to 30 kV/mm, i.e. the ratio of the maximum volume resistivity and the minimum volume resistivity in said range is $4.8\times10^{15}/1.1\times10^{15}=4.36$ (example 2d A stage).

Example 3 showed still an acceptable temperature dependency of the volume resistivity in the applied voltage range, but the temperature dependency of the volume resistivity in the range of 25 to 90° C. at an electric field of 10 kV/mm to 30 kV/mm, i.e. the ratio of the maximum volume resistivity and the minimum volume resistivity in said range is $7.2\times10^{15}/8.4\times10^{14}=8.57$. Example 3 in some instance could already show failures due to disruptive discharge and a loss of tracking resistance.

The volume resistivity values show that the temperature dependency of example 2d is smaller than in example 3 which is favourable for the high voltage application in cable joints. Additionally, the volume resistivity in example 2d (A stage) decreases with increasing applied voltages whereas in example 3 the volume resistivity increases with increasing voltages at all particular given temperatures.

Comparative example 4 does not provide a level of volume resistivity high enough for an appropriate insulator. Accordingly the maximum measurable voltage was only up to 0.3 kV for 25, 60 and 90° C. Higher voltages lead to complete material breakdown.

TABLE 2 composition of example 2c, 2d and 3, and comparative example 4 (all percentages are weight percent)

| | | Example 2c % | Example 2d % | Ex.3 % | Comp. Ex.4 % |
|---|---|---|---|---|---|
| Vinyl terminated PDMS 10 Pa · s | $M^{Vi}_2D_{540}$ | 50.55 | 50.05 | 50.05 | 49.05 |
| Vinyl terminated PDMS 65 Pa · s | $M^{Vi}_2D_{900}$ | 21.5 | 21.5 | 21.5 | 21.5 |
| Silylated $SiO_2$ [1)] | 300 $m^2/g$ | 18 | 18 | 18.4 | 16.5 |
| PDMS vinyl side & end groups 0.2 Pa · s | $M^{Vi}_2D_{75}D^{vi}_{10}$ | 2.1 | 2.1 | 2.1 | 2.1 |
| SiH PDMS 4.3 mmol/g SiH | $M_2D_{20}D^H_{10}$ | 4.74 | 4.74 | 4.74 | 4.74 |
| SiH PDMS 2.3 mmol/g SiH | $M_2D_{100}D^H_{20}$ | 2.94 | 2.94 | 2.94 | 2.94 |
| 1-ethinyl-2-cyclohexanol | ECH | 0.06 | 0.06 | 0.06 | 0.06 |
| Pt-cat. 1.47% Pt in PDMS 10 Pa · s vinyl term. | Pt-0-$M^{Vi}_2$-complex | 0.11 | 0.11 | 0.11 | 0.11 |
| Ketjen black EC300J component d) | carbon black | — | 0.5 | 0.1 | 3 |
| sum | | 100.00 | 100.00 | 100.00 | 100.00 |

[1)] silylated SiO2 incl. parts of silazane reaction products

TABLE 3

Mechanical and electrical properties of the examples 2d, example 3 and comparative example 4

| | | Examples | | | |
|---|---|---|---|---|---|
| | | ex.2d A-stage)[2] | ex. 2d B-stage)[3] | ex. 3 A-stage)[2] | Comp. ex. 4 A stage)[2] |
| Example 2a + 2b 1:1 | pt. wt. | 100 | 100 | 100 | 100 |
| Carbon black | % | 0.5 | 0.5 | 0.1 | 3 |
| Viscosity @25° C. before cure | Pa · s | 51 | | 51 | not measured |
| Hardness | °Shore | 32 | 29 | 33 | 31 |
| Tensile strength | MPa | 5.6 | 5.1 | 5.9 | 4.6 |
| Elongation | % | 555 | 518 | 396 | 458 |
| Modulus 50% | MPa | 0.38 | 0.36 | 0.62 | 0.43 |
| Modulus 100% | MPa | 0.65 | 0.68 | 1.19 | 0.75 |
| Modulus 200% | MPa | 1.4 | 1.56 | 2.66 | 1.53 |
| Modulus 200% | MPa | 2.32 | 2.58 | 4.25 | 2.52 |
| Tear resistance ASTM D 624 die B | N/mm | 22 | 23 | 28 | 8 |
| Surface resistivity | Ohm | $2.3 * 10^{16}$ | $3.8 * 10^{16}$ | $2.6 * 10^{16}$ | $1.3 * 10^{6}$ |
| Tracking resistance 4.5 kV)* | | passed | passed | passed | failed |
| | | Volume resistivity | | | |
| Vol. res. 10 KV @ 25° C. | Ohm * cm | $4.8 * 10^{15}$ | $5.5 * 10^{15}$ | $6.5 * 10^{15}$ | failure |
| Vol. res. 10 KV @ 60° C. | Ohm * cm | $3.8 * 10^{15}$ | $4.8 * 10^{15}$ | $1.8 * 10^{15}$ | failure |
| Vol. res. 10 KV @ 90° C. | Ohm * cm | $2.5 * 10^{15}$ | $2.4 * 10^{15}$ | $8.4 * 10^{14}$ | failure |
| Vol. res. 20 KV @ 25° C. | Ohm * cm | $3.5 * 10^{15}$ | $4.7 * 10^{15}$ | $7.2 * 10^{15}$ | failure |
| Vol. res. 20 KV @ 60° C. | Ohm * cm | $2.4 * 10^{15}$ | $3.4 * 10^{15}$ | $2.1 * 10^{15}$ | failure |
| Vol. res. 20 KV @ 90° C. | Ohm * cm | $1.3 * 10^{15}$ | $2.3 * 10^{15}$ | $8.5 * 10^{14}$ | failure |
| Vol. res. 30 KV @ 25° C. | Ohm * cm | $2.1 * 10^{15}$ | $3.3 * 10^{15}$ | $7.3 * 10^{15}$ | failure |
| Vol. res. 30 KV @ 60° C. | Ohm * cm | $1.5 * 10^{15}$ | $2.6 * 10^{15}$ | $2.3 * 10^{15}$ | failure |
| Vol. res. 30 KV @ 90° C. | Ohm * cm | $1.1 * 10^{15}$ | $2.2 * 10^{15}$ | $8.8 * 10^{14}$ | failure |

)[2]10 min 175° C.
)[3]post cured 4 h 200° C.
)*IEC 60587

The invention claimed is:

1. A method for the manufacture of a cable joint or a cable termination comprising the steps of:

(i) providing a silicone composition, obtained by curing a composition comprising:

a) 100 pt·wt. of at least one polyorganopolysiloxane having alkenyl groups, b) 0-100 ptwt. of a crosslinker component comprising at least one polyorganohydrogensiloxane, c) 0-100 pt·wt. of a filler component comprising one or more reinforcing silicas, d) >0.1-2 pt·wt. of at least one dielectric active compound selected from the group consisting of oxides, carbides, ferrites or spinels of any of Ti, Al, Zn, Fe, Mn, Mo, Ag, Bi, Zr, Ta, B, Sr, Ba, Ca, Mg, Na, K, and Si, e) a curing catalyst selected from the group consisting of 0-1000 ppm of a compound enabling hydrosilylation and 0.1 to 2 wt.-% of an organic peroxide each related to the sum of the amounts of the components a) to d), and f) 0-50 pt·wt. of one or more auxiliary additives, said silicone composition having a temperature dependency of the volume resistivity in the range of 25 to 90° C. at an electric field of 10 kV/mm to 30 kV/mm, such that the ratio of the maximum volume resistivity and the minimum volume resistivity is <10, and the volume resistivity in the range of 25 to 90° C. at an electric field of 10 kV/mm to 30 kV/mm is between $1*10^{14}$ and $1*10^{16}$ Ohm*cm, (ii) providing a conductive shaped optionally cured silicone composition which differs from the silicone composition of (i), and (iii) encapsulating at least a part of the surface of the composition of (ii) with a composition according to (i) in a mold to form and cure a cable joint or cable termination.

2. A method for sealing and/or insulating connected cables or closing cable ends comprising sealing and/or insulating connected cables or closing the cable ends with the cable joint of claim 1.

3. The silicone composition of claim 1, wherein the dielectric active compound is selected from the group consisting of (i) oxides and (ii) spinels of (a) Ti, (b) Al, (c) Zn, (d) Fe or (e) Mg.

4. The silicone composition of claim 1, wherein the at least one polyorganosiloxane having alkenyl groups further comprises (i) organic substituents R selected from the group consisting of alkyl, phenyl, and trifluoropropyl groups and (ii) substituents $R^1$ being alkenyl, and (iii) has an average degree of polymerization $P_n$ between 100 to 12000 siloxy units.

5. The silicone composition of claim 4, wherein the alkenyl substituents $R^1$ comprise vinyl groups.

6. The silicone composition of claim 4, wherein the crosslinker component b) is selected from the group consisting of polyorganohydrogensiloxane comprising units of the formula RHSiO and $R_2HSiO_{0.5}$ and having a concentration of SiH units of 1 to 100 mol. % related to all siloxane units of the polyorganohydrogensiloxane of component b).

7. The silicone composition of claim 4, wherein the filler component c) comprises fumed silicas having a BET surface area of 50 to 400 $m^2/g$.

8. The silicone composition of claim 1, wherein the dielectric active compound d) is selected from the group consisting of (i) oxides, (ii) carbides, and (iii) ferrites of (a) Ti, (b) Al, (c) Zn, (d) Fe, and (e) Si.

9. The silicone composition of claim 1, wherein the dielectric active compound d) includes less than 5 wt. % ZnO.

10. The silicone composition of claim 9, wherein the dielectric active compound d) is free of ZnO.

11. The silicone composition of claim 1, wherein the dielectric active compound d) is selected from the group consisting of (i) titanium dioxide;

(ii) wet or precipitated silicas; and (iii) oxides, (v) spinels, or (vi) ferrites of (a) Fe or (b) Zn.

12. The silicone composition of claim 1, wherein the dielectric active compound d) has a BET surface area of 30 to 1000 $m^2/g$ and an average particle size of $D_{50}$ of 0.001 to 50 μm.

13. The silicone composition of claim 1, wherein the curing catalyst e) is a hydrosilylation catalyst selected from the group consisting of (i) metals and (ii) metal compounds of (a) Pt, (b) Pd, (c) Rh, (d) Co, (e) Ni, (g) Ir or (g) Ru.

14. The silicone composition of claim 1, wherein the curing catalyst e) is an organic peroxide selected from the group consisting of (i) substituted or (ii) unsubstitued (a) dialkyl-, (b) alkylaroyl-, or (c) diaroyl-peroxides.

15. An insulator or a field grading assembly comprising said insulator for high voltage direct current application which is obtained by curing the composition of claim 1.

16. A method of insulating or field grading of high voltage direct current assemblies, comprising the step of forming an insulating or field grading layer in said high voltage direct current assemblies by curing a composition comprising:

a) 100 pt·wt. of at least one polyorganopolysiloxane having alkenyl groups, b) 0-100 ptwt. of a crosslinker component comprising one or more polyorganohydrogensiloxanes, c) 0-100 pt·wt. of a filler component comprising one or more reinforcing silicas or resins, d) >0.1-2 pt·wt. of at least one dielectric active compound selected from the group consisting of oxides, carbides, ferrites or spinels of any of Ti, Al, Zn, Fe or Mg, e) a curing catalyst selected from the group consisting of 0-1000 ppm of a compound enabling hydrosilylation and 0.1 to 2 wt.-% of an organic peroxide each related to the sum of the amounts of the components a) to d), and f) 0-50 pt·wt. of one or more auxiliary additives, said cured silicone composition having a temperature dependency of the volume resistivity in the range of 25 to 90° C. at an electric field of 10 kV/mm to 30 kV/mm, such that the ratio of the maximum volume resistivity and the minimum volume resistivity is less than 10, and the volume resistivity in the range of 25 to 90° C. at an electric field of 10 kV/mm to 30 kV/mm is between $1*10^{11}$ and $1*10^{16}$ Ohm*cm.

* * * * *